(12) United States Patent
Stecko et al.

(10) Patent No.: US 7,937,190 B2
(45) Date of Patent: *May 3, 2011

(54) APPARATUS FOR AN AUTOMATED AERIAL REFUELING BOOM USING MULTIPLE TYPES OF SENSORS

(75) Inventors: Stephen M. Stecko, Fullerton, CA (US); Walton R. Williamson, Burbank, CA (US); John F. Takacs, Long Beach, CA (US); Jason L. Speyer, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/481,457

(22) Filed: Jun. 9, 2009

(65) Prior Publication Data
US 2009/0248225 A1  Oct. 1, 2009

Related U.S. Application Data

(62) Division of application No. 11/742,409, filed on Apr. 30, 2007.

(51) Int. Cl.
*B64D 39/00* (2006.01)
*G05D 1/00* (2006.01)
*G06F 19/00* (2006.01)
*H04B 7/00* (2006.01)

(52) U.S. Cl. ........................................ 701/3; 244/135 A
(58) Field of Classification Search .. 701/3; 244/135 A; 455/41.2
See application file for complete search history.

(56) References Cited

U.S. PATENT DOCUMENTS

| 3,917,196 A | 11/1975 | Pond et al. |
| 4,170,773 A | 10/1979 | Fitzsimmons et al. |
| 6,752,357 B2 | 6/2004 | Thal et al. |
| 6,954,551 B2 | 10/2005 | Weismuller |

(Continued)

FOREIGN PATENT DOCUMENTS

EP  1 424 283 A  6/2004

(Continued)

OTHER PUBLICATIONS

Guy Norris, Aerial refueling; Tankers on Trial, Flight International, May 2004, pp. 32-37, VN 4629.

*Primary Examiner* — Khoi Tran
*Assistant Examiner* — Rodney King
(74) *Attorney, Agent, or Firm* — Haynes & Boone, LLP.

(57) ABSTRACT

A system for automated control of a refueling boom coupled to a tanker aircraft is provided. The system includes: a first inertial measurement unit (IMU) providing inertial measurements for the tanker aircraft; a first GPS receiver providing a GPS location for a GPS antenna attached to the tanker aircraft; and a processor adapted to calculate a first inertial navigation state for the tanker aircraft through integration of the inertial measurements, the processor being further adapted to calculate a first inertial navigation state error relative to the GPS location and to filter the first inertial navigation state error and the first inertial navigation state based upon noise characteristics of the first IMU and the first GPS receiver to provide an updated inertial navigation state for the tanker aircraft, the processor being further adapted to control the refueling boom relative to a receiver aircraft based upon the first and updated inertial navigation states.

11 Claims, 3 Drawing Sheets

U.S. PATENT DOCUMENTS

| | | | |
|---|---|---|---|
| 2002/0116126 A1* | 8/2002 | Lin | 701/214 |
| 2003/0209633 A1 | 11/2003 | Thal et al. | |
| 2003/0216865 A1* | 11/2003 | Riewe et al. | 701/220 |
| 2005/0114023 A1* | 5/2005 | Williamson et al. | 701/214 |
| 2006/0074558 A1 | 4/2006 | Williamson et al. | |

FOREIGN PATENT DOCUMENTS

| | | |
|---|---|---|
| EP | 1 705 116 A | 9/2006 |
| WO | WO 98/07623 A | 2/1998 |
| WO | WO 98/39207 A | 9/1998 |

* cited by examiner

APPARATUS FOR AN AUTOMATED AERIAL REFUELING BOOM USING MULTIPLE TYPES OF SENSORS

RELATED APPLICATION

This application claims priority to and is a divisional of U.S. patent application Ser. No. 11/742,409, filed Apr. 30, 2007, entitled "Apparatus For An Automated Aerial Refueling Boom Using Multiple Types of Sensors," which is incorporated herein by reference in its entirety.

TECHNICAL FIELD

The present invention relates generally to the control of aerial refueling booms, and more particularly to automated control of aerial refueling booms using multiple sensors.

BACKGROUND

Aerial tankers use refueling booms to fuel other aircraft in mid-flight. In this fashion, the refueled (receiver) aircraft can fly extended missions during military or civilian operations. Generally, the aerial tanker and the receiver aircraft must be flown in close proximity to accomplish a refueling. Given this proximity, a manual operator in the aerial tanker may extend its refueling boom to mate with the fuel tank of the receiver aircraft.

In general, the refueling boom operation can tax the skill of even experienced boom operators. The possibility of midair accidents is ever present. In addition, the refueling boom may improperly mate with the receiver aircraft. For example, a stealth aircraft may have its low observable coating contacted such that it becomes observable to enemy radar. In such a case, the stealth aircraft may have to abort its mission and return for repair.

During the refueling operation, the boom operator must manually direct the refueling boom to mate with the receiver aircraft. This manual direction must be accomplished in varied lighting conditions from extremely bright sun light to complete darkness or minimum visibility weather conditions. Moreover, the manual direction may be further complicated by turbulence. Because of this manual operation, refueling operations are lengthy as compared to machine-guided refueling. In addition, the need for human boom operators makes unmanned aerial tankers unfeasible. Finally, manual operation is inevitably prone to error and mishap.

Conventional machine-guided boom controls typically use an electro-optic sensor to estimate the boom and receiver aircraft position. By removing the need for human boom operators, unmanned aerial tankers can be developed, which can lead to significant cost savings. For example, it has been estimated that manned aircraft use 80% of their service life to train aircrews. Conventional electro-optic boom automated boom control thus advantageously lessens the need for human operators. However, although electro-optic sensors can be quite accurate, they are range limited.

Accordingly, there is a need in the art for more robust machine-guided boom control systems.

SUMMARY

Apparatuses, systems, and methods are disclosed herein which provide automated refueling boom control in a cost-effective manner for a multitude of commercial and military applications. Specifically, apparatuses, devices, and methods are disclosed herein that relate to the integration of data from multiple sensors to provide more robust and accurate automated control of refueling booms.

In accordance with an embodiment, a system for automated control of a refueling boom coupled to a tanker aircraft is provided. The system includes: a first inertial measurement unit (IMU) providing inertial measurements for the tanker aircraft; a first GPS receiver providing a GPS location for a GPS antenna attached to the tanker aircraft; and a processor adapted to calculate a first inertial navigation state for the tanker aircraft through integration of the inertial measurements, the processor being further adapted to calculate a first inertial navigation state error relative to the GPS location and to filter the first inertial navigation state error and the first inertial navigation state based upon noise characteristics of the first IMU and the first GPS receiver to provide an updated inertial navigation state for the tanker aircraft, the processor being further adapted to control the refueling boom relative to a receiver aircraft based upon the first and updated inertial navigation states.

In accordance with another embodiment, a system for control of a refueling boom coupled to a tanker aircraft is provided. The system includes: an IMU providing tanker inertial measurements for the tanker aircraft; an IMU providing receiver inertial measurement for a receiver aircraft; and means for controlling the refueling boom so as to automatically mate with the receiver aircraft, wherein the means controls refueling boom by filtering the tanker and receiver inertial measurements relative to measurements from a sensor selected from the group consisting of a GPS receiver and an EO sensor.

In accordance with another embodiment, a method of controlling a refueling boom relative to a tanker aircraft and a receiver aircraft is provided. The method includes the acts of: deriving an inertial navigation state for the tanker aircraft; deriving an inertial navigation state for the receiver aircraft; comparing the inertial navigation states to additional sensor measurements to derive an inertial navigation state error for the tanker aircraft and an inertial navigation state error for the receiver aircraft; filtering the inertial navigation states and the inertial navigation state errors to provide an updated inertial navigation state for the receiver aircraft and an updated inertial navigation state for the tanker aircraft; and controlling the refueling boom based upon the updated inertial navigations states so as to automatically mate with the receiver aircraft.

The scope of the present invention is defined by the claims, which are incorporated into this section by reference. A more complete understanding of embodiments of the present invention will be afforded to those skilled in the art, as well as a realization of additional advantages thereof, by a consideration of the following detailed description. Reference will be made to the appended sheets of drawings that will first be described briefly.

BRIEF DESCRIPTION OF THE FIGURES

Embodiments of the present invention and their advantages are best understood by referring to the detailed description that follows. It should be appreciated that like reference numerals are used to identify like elements illustrated in one or more of the figures.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

To provide a robust automated control system for aerial refueling, data from multiple sensors are integrated in a process that may be denoted as "sensor fusion" to accurately position a refueling boom with regard to both the aerial tanker and the receiver aircraft. In one embodiment, this integration uses inertial state information from inertial measurement units (IMUs) located on the aerial tanker and the receiver aircraft to propagate inertial navigation states for each aircraft. Each inertial navigation state has its own independent error dynamics. However, a combined state space may be formed which depends upon the error dynamics from each IMU. This combined state space provides a convenient format for mixing in other sensor information such as GPS sensor information or electro-optic (EO) sensor information to correct the inertial navigation state using a filter such as an extended Kalman filter. Because both navigational states are thereby corrected, the resulting extended Kalman filter may be referred to as a Global Extended Kalman Filter (GEKF).

Figure 1:
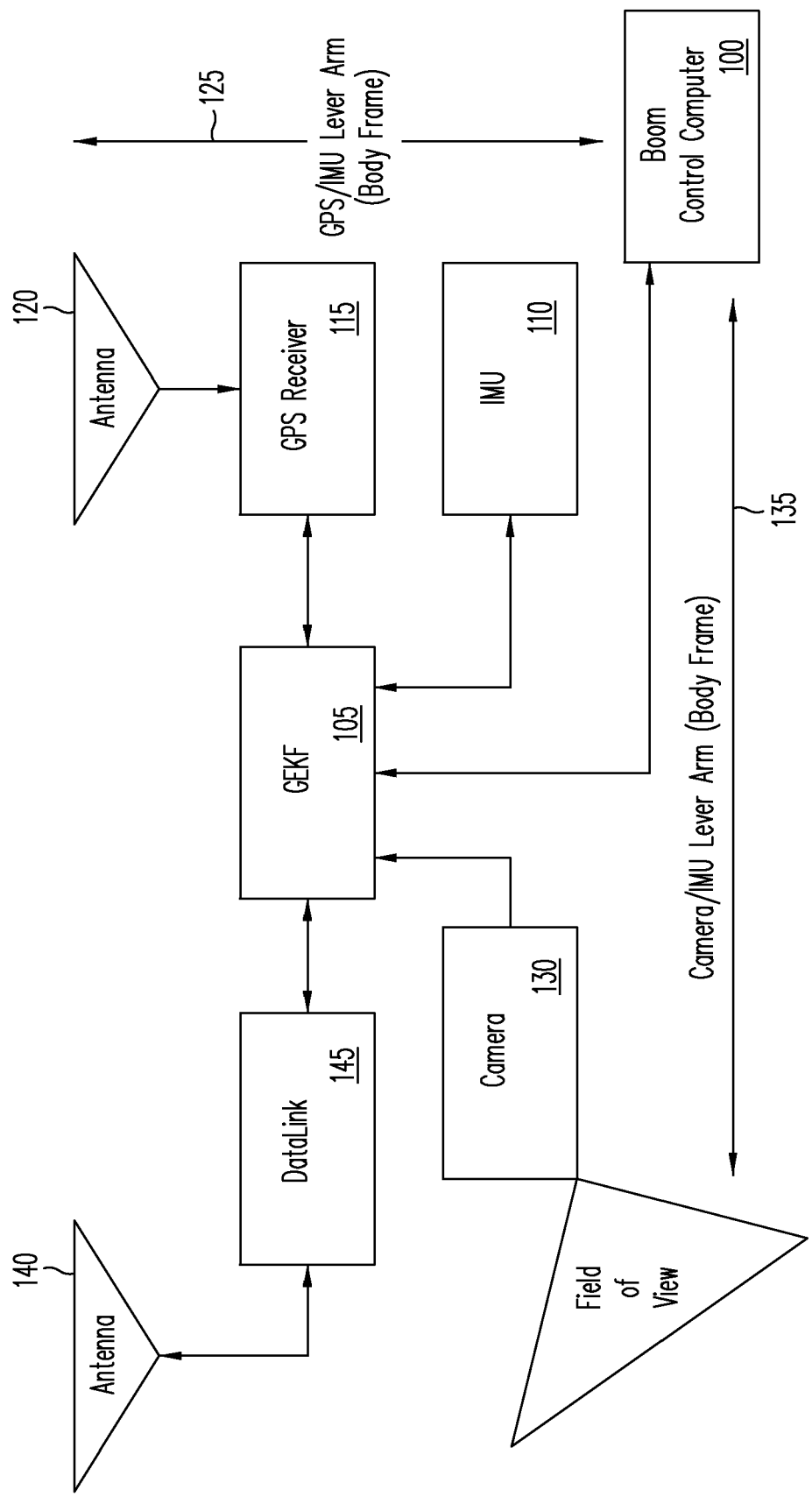
FIG. 1 shows tanker components for an automated refueling boom control system in accordance with an embodiment of the present invention.

In one embodiment, the tanker, the refueling boom, and the receiver aircraft are all processed through the GEKF so as to estimate the relative position velocity, and attitude between the tanker and the receiver aircraft, from the tanker to the boom, and ultimately from the boom tip to the receiver aircraft receptacle. The inertial state consists of the position, velocity, and attitude of each player in an inertial reference frame. It may also be expanded to include linear acceleration and angular rate. Each IMU provides measurements of linear acceleration and angular rate for its location. The tanker, the refueling boom, and the receiver aircraft (each IMU-tracked object may be denoted as a "player" in the following discussion) may have their own IMU measurements. For example, FIG. 1 illustrates tanker-based components of an exemplary automated refueling boom control system. The refueling boom (not illustrated) may be controlled by a boom control computer 100 that receives information from a GEKF 105. Positional information for the receiver aircraft is derived from an IMU 110. As will be explained further herein, velocity and angular acceleration measurements from IMU 110 may be integrated using, for example, strap down equations of motion to provide position and attitude (roll, pitch and yaw) information for the receiver aircraft. GEKF 105 updates or corrects the strap-down-equations-of-motion-derived positional information based upon measurements from other sensors such as from a GPS receiver 115. This position data will be denoted as "a priori" position data in the following discussion. Receiver 115 provides GPS-derived positional measurements based upon GPS signals received at a GPS antenna 120. For GEKF 105 to correct the a priori position data with the GPS-derived measurements, the position of the antenna 120 may be derived from the a priori position data through appropriate translation based upon a body frame lever arm 125 between IMU 110 and GPS antenna 120. GEKF 105 receives position data from other players such as the receiver aircraft (discussed with regard to FIG. 2) through an antenna 140 and a corresponding data link 145. The a priori position data for these other players with regard to IMU 110 may be corrected through GEKF 105 using measurements from electro-optic (EO) sensors such as a camera 130. To do so, the a priori position data is translated based upon a body frame lever arm 135 between IMU 110 and camera 130.

Figure 2:
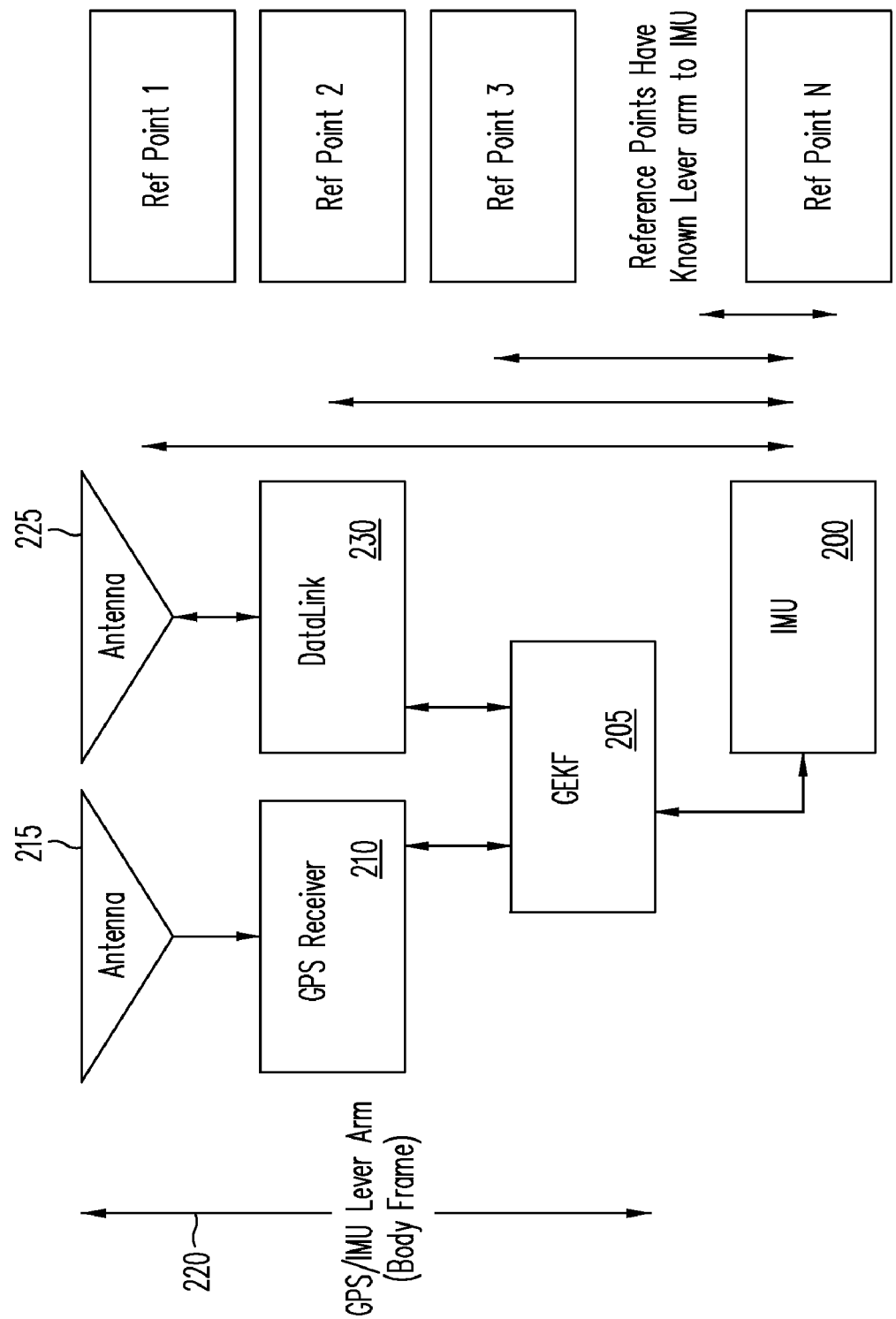
FIG. 2 shows an receiver aircraft components for an automated refueling boom control system according to an embodiment of the present invention.

Turning now to FIG. 2, complementary components may be located on a receiver aircraft. A receiver aircraft IMU 200 provides measurements to a GEKF 205 so that a priori position data may be derived as discussed with regard to FIG. 1. This a priori position data may be updated based upon GPS measurements from a GPS receiver 210 having a GPS antenna 215. The a priori position data for the receiver aircraft is translated to the GPS antenna location using a body frame lever arm 220 between IMU 200 and GPS antenna 215. GEKF 205 also receives position data from other players by receiving signals through a data link 230 as received by an antenna 225. Referring back to FIG. 1, camera 130 has a field of view 150 that allows the imaging of reference points such as reference points 1 through N on the receiver aircraft. In addition, camera 130 will image similar reference points on the refueling boom (not illustrated). Each of the receiver aircraft reference points has a known body frame lever arm between the receiver aircraft IMU 220 and the corresponding reference point. Thus, the receiver aircraft a priori position data may be translated using the corresponding lever arm to each of the reference points so that GEKF 205 may update its position as will be explained further herein.

It may thus be seen that to estimate the inertial states of and the relative states between each player, some combination of measurements from Global Positioning System (GPS) receivers, Inertial Measurement Units (IMU's), wireless or wired communication, and Electro-Optic (EO) sensors are blended in a process denoted herein as "sensor fusion." This process may be classified into two stages or phases. A first stage is referred to as the propagation phase. In this phase, the inertial states for each player are formed. The following discussion will assume that an inertial navigation state will be determined with regard to IMU measurements. However, it will be appreciated that the sensor fusion techniques discussed herein may be applied in systems without IMUs. For each player that has an IMU, the linear accelerations and angular rate measurements if available are utilized to aid in the propagation of the inertial navigation state for that vehicle. The acceleration and angular rate measurements are integrated in time using the strap down equations of motion to obtain the a priori position data, which may also be denoted as the inertial navigation states for each player. A second phase consists of utilizing other sensor measurements to adjust the inertial navigation states of each player (as determined in the first phase). For example, GPS measurements may be utilized to correct the absolute position estimates of each state. Differential GPS measurements provide precise corrections of the relative position estimates. EO measurements provide precise correction to the relative position and attitude estimates. Finally, if IMU data is available, errors in the IMU such as bias errors, scale factor errors, and misalignment errors may be calibrated and removed in order to improve the propagation phase of the estimation process. The navigation states thus created by the multi sensor system may then be provided to a conventional Boom Control Unit (BCU) which in turn commands the boom actuators to move the boom toward the target, and into contact. Given this overview, the first phase of sensor fusion will be discussed as follows.

Propagation Phase for the Inertial States

Each player in the methodology, whether boom, tanker, or receiver, is represented with an inertial navigation state. This state consists of the position, velocity, and attitude relative to an inertial reference frame. In one embodiment, the inertial reference frame consists of a set of axes fixed in inertial space. For example, an Earth Centered Earth Fixed (ECEF) coordinate frame and consists of an orthogonal set of coordinate axes emanating from the center of the earth. The positive z-axis points through the North Pole, the positive x-axis points through the equator at the Greewich Meridian, and the y-axis completes the right-hand coordinate frame. The ECEF moves relative to the inertial frame at a constant rotation rate (defined by the Earth's rotation). The state may be expanded to include the angular rate and acceleration relative to this frame.

Given this definition of ECEF coordinates, a player's inertial state x may be represented as $$x = \begin{bmatrix} P^E \\ V^E \\ Q_B^E \end{bmatrix} \quad \text{(Eq. 1)}$$

In this embodiment, the state x consists of a position $P^E$ in the ECEF frame, a velocity $V^E$ in the ECEF frame, and a quaternion $Q_B^E$ defining a body frame attitude of the vehicle relative to the ECEF frame. In such embodiment, the body frame is defined separately for each player. For example, the body frame may be consistent with typical "aircraft coordinates" such that it consists of an orthogonal coordinate axis frame with a positive x axis through the nose of the aircraft, a positive y-axis through the starboard side of the aircraft and a z axis positive down.

Note that IMU measurements consist of the measurement of acceleration and angular rates in the body frame of the IMU which may or may not be consistent with the vehicle body frame. However the IMU is rigidly mounted to the vehicle and a constant rotation may be employed to relate the IMU to the vehicle frame.

Referring back to FIGS. 1 and 2, IMUs 200 and 110 provide acceleration and angular rates. These measurements may be processed to obtain a derivative of the inertial navigation state x (Eq. 1), designated as ẋ. This derivative is integrated to obtain the propagated state using, for example, the strap down equations of motion:

$$\dot{x} = \begin{bmatrix} \dot{P}^E \\ \dot{V}^E \\ \dot{Q}_B^E \end{bmatrix} \quad \text{(Eq. 2)}$$

$$= \begin{bmatrix} V^E \\ C_B^E a^B - \omega_{IE}^E \times (\omega_{IE}^E \times P^E) - 2\omega_{IE}^E \times V^E + g^E \\ \frac{1}{2}[\Omega_{EB}^B \times] Q_B^E \end{bmatrix}$$

where a matrix $C_B^E$ is the rotation matrix calculated from the quaternion $Q_B^E$, a specific force vector $a^B$ represents the linear acceleration exhibited on the vehicle in the vehicle body frame, a gravity vector $g^E$ is represented in the ECEF frame, an earth rotation rate $\omega_{IE}^E$ represents the rotation of the ECEF frame relative to the inertial reference frame, a vector cross product between two vectors a and b is represented as a×b, and a quaternion rate matrix $[\Omega_{EB}^B \times]$ is defined as:

$$[\Omega_{EB}^B \times] = \begin{bmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{bmatrix} \quad \text{(Eq. 3)}$$

$$\omega_{EB}^B = \begin{bmatrix} \omega_x \\ \omega_y \\ \omega_z \end{bmatrix}$$

where the angular velocity term $\omega_{EB}^B$ represents the angular velocity of the vehicle body frame relative to the ECEF frame represented in the vehicle body frame.

The measurements from each IMU are the linear acceleration in the body frame $a^B$ and the angular velocity of the body frame relative to the inertial frame, $\omega_{IB}^B$. The following definition holds for the angular velocities:

$$\omega_{IB}^B = \omega_{IE}^E + \omega_{EB}^B \quad \text{(Eq. 4)}$$

Using these definitions, it is possible to integrate the strap down equations of motion using the IMU measurements, if available. If not, the angular velocity and acceleration can be estimated using the corrections from the GEKF defined herein.

Error in the Propagated State

The strap down equations of motion (Eq. 2) are susceptible to errors in the acceleration or angular rate data. The errors grow as a function of time. This growth is predictable using a linearization. The linearization estimates the error growth over short periods of time. An error growth may be defined as:

$$\begin{bmatrix} \delta \dot{P}^E \\ \delta \dot{V}^E \\ \delta \dot{q}_B^B \end{bmatrix} = \begin{bmatrix} 0 & I & 0 \\ G - [\omega_{IE}^E \times]^2 & -2[\omega_{IE}^E \times] & -2C_B^E a^B \\ 0 & 0 & -[\omega_{IB}^B \times] \end{bmatrix} \begin{bmatrix} \delta P^E \\ \delta V^E \\ \delta q_B^B \end{bmatrix} + \quad \text{(Eq. 5)}$$

$$\begin{bmatrix} 0 \\ C_B^E w_a \\ w_g \end{bmatrix}$$

where a gravity gradient G is a function of ECEF position defined by an Earth gravity model such as the J2 gravity model, a linearized quaternion error $q_B^B$ represents the linearized error in the full quaternion $Q_B^E$, a noise term $w_a$ represents the error in the accelerometer measurements, a noise term $w_g$ represents the error in the angular rate measurements, and a quaternion error is defined as:

$$C_B^E = \tilde{C}_B^E (I + 2[\delta q_B^B \times]) \quad \text{(Eq. 6)}$$

In this case $\tilde{C}_B^E$ is the a priori estimate of attitude calculated from an a prior estimate $\tilde{Q}_B^E$ of $Q_B^E$. Eq. 6 also implies a method of correcting the a priori rotation once the error is calculated using filtering methods derived below.

Note that Eq. (5) can be expanded to include other error sources. For instance, accelerometer bias, scale factor and misalignment may be included as additional states. In addition, the same errors may be included for the gyroscope measurements (if used). Finally, GPS clock errors may be included. Adding other error sources further refines the error model, thus improving knowledge of how errors in the navigation state grow in time.

These dynamics are used in the Global Extended Kalman Filter (GEKF) as discussed further herein. Note that each player will have an inertial state x as derived from integration of Eq. (2). Each state is propagated using the available estimates of acceleration and angular velocity either from an IMU or from estimation using GPS/EO. The propagation of each state occurs independently of any other vehicle. The error growth of the state estimate is defined in Eq. (5). These dynamics may be simplified to the form:

$$\delta \dot{x} = A \delta x + Bw \quad \text{(Eq. 7)}$$

Matrix A and vector B may be derived through a comparison of Eqs. (5) and (7). Note that noise terms (summarized as vector w) for the IMU measurements are known through, for example, a manufacturer-provided analysis of each IMU. Thus, the unknown is the error term δx in the a priori position data/inertial navigation state x. Each player (such as the tanker of FIG. 1 and the receiver aircraft of FIG. 2) has its own independent error term. However, a combined state space may be formed as:

$$\begin{bmatrix} \delta \dot{x}_1 \\ \delta \dot{x}_2 \end{bmatrix} = \begin{bmatrix} A_1 & 0 \\ 0 & A_2 \end{bmatrix} \begin{bmatrix} \delta x_1 \\ \delta x_2 \end{bmatrix} + \begin{bmatrix} B_1 & 0 \\ 0 & B_2 \end{bmatrix} \begin{bmatrix} w_1 \\ w_2 \end{bmatrix} \quad \text{(Eq. 8)}$$

where $\delta x_1$ is the error in the inertial navigation state of a first vehicle and $\delta x_2$ is the error in the state of a second vehicle. A simple rotation can be used to redefine the error as:

$$\begin{bmatrix} \delta \dot{x}_1 \\ \delta \Delta \dot{x} \end{bmatrix} = \begin{bmatrix} A_1 & 0 \\ A_1 - A_2 & A_2 \end{bmatrix} \begin{bmatrix} \delta x_1 \\ \delta \Delta x \end{bmatrix} + \begin{bmatrix} B_1 & 0 \\ B_1 & -B_2 \end{bmatrix} \begin{bmatrix} w_1 \\ \Delta w \end{bmatrix} \quad \text{(Eq. 9)}$$

where $\delta \Delta x = \delta x_1 - \delta x_2$. This dynamic state is now in terms of the absolute navigation error of the first vehicle and the relative navigation error between the first vehicle and the second vehicle. The error shows how two inertial navigation states drift relative to each other. This relative state is a convenient format for mixing measurements from, for example, EO sensors and GPS sensors for correction of the inertial navigation states. Each of these sensors may be provide a sensor position estimate that may be compared to a IMU-derived position estimate for the sensor (through appropriate translation) of the IMU inertial navigation state x. These other sensors also have a known noise behavior as discussed with regard to the IMUs. A filter such as an Extended Kalman filter may then process the sensor position estimate, the IMU-derived sensor position estimate, and the noise behaviors for the IMU and the sensor to determine the error term δx of Eq. (7). The inertial navigation state x may then be corrected. In this fashion, although the sensor and IMU measurements are noisy, the inertial navigation state is estimated having an error that is optimal in a least-means-squared sense. Assuming that the combined error space from Eq. (9) is used, a resulting Extended Kalman filter may be referred to as a Global Extended Kalman Filter (GEKF) as shown in FIGS. 1 and 2 because of the error terms for both players are determined simultaneously.

Note the advantages of such an automated boom control system. Because IMU measurements are fused with other sensor measurements in a statistically optimal fashion, very accurate automatic control of the refueling boom is made possible for the first time. In this fashion, unmanned aerial refueling tankers are enabled, providing significant cost savings for both commercial and military applications. The solution is quite flexible in that multiple types of sensor measurements may be fused together. Not only is a statistically optimal control solution provided, but fault detection methods are also disclosed. Should faults be detected in, for example, acceleration sensors in the IMU or GPS satellite transmissions, an appropriate reconfiguration of the automated refueling boom control system is disclosed. Sensor fusion with regard to GPS measurements will be addressed first in the following discussion.

Correction of the Propagated Inertial States Using GPS Measurements

GPS measurements include measurements of a position and a velocity for a GPS receiver antenna. These measurements may be used to correct an inertial state provided that the lever arm between the GPS antenna and the location of the inertial state reference point is known. For instance, the strap down equations of motion (Eq. 1.1.2) are typically integrated at the location of the IMU. Transfer of the IMU position estimates to the GPS antenna location is performed as follows:

$$P_{GPS}^E = P_{IMU}^E + C_B^E L_{I2G} \quad \text{(Eq. 10)}$$

where $P_{GPS}^E$ is the position of the GPS antenna location in the ECEF coordinate frame, $P_{IMU}^E$ is the position of the IMU in the ECEF coordinate frame matrix, and $L_{I2G}$ represents the vector distance from the IMU to the GPS antenna in the vehicle body frame. Velocity estimates may be transferred using similar methods:

$$V_{GPS}^E = V_{IMU}^E + C_B^E(\omega_{IB}^B \times L_{I2G}) - \omega_{IE}^E \times C_B^E L_{I2G} \quad \text{(Eq. 11)}$$

where $V_{GPS}^E$ is the velocity for the GPS antenna in the ECEF coordinate frame, and $V_{IMU}^E$ is the velocity for the IMU in the ECEF coordinate frame. Referring back to FIG. 1, an IMU-derived position for IMU 110 may thus be translated to provide an IMU-derived position estimate for GPS antenna 120 based upon lever arm 125. For a given GPS antenna and an IMU inertial state, the GPS position measurements may be modeled as a function of the inertial navigation state error using the perturbation methods defined previously with regard to Eq. (7). In that regard, GPS receiver 115 provides a GPS-derived position estimate for GPS antenna 120 that may be denoted as $\tilde{P}_{GPS}^E$. The inertial-navigation-state-derived position (which is typically an IMU-derived position) may be denoted as $\overline{P}_{GPS}^E$. Using the inertial navigation state error term error term $\delta x_1$ $\tilde{P}_{GPS}^E$ may thus be defined using the following measurement function:

$$\tilde{P}_{GPS}^E = \overline{P}_{GPS}^E + C_P \delta x + v \quad \text{(Eq. 12)}$$

where v is measurement noise, and a sensitivity matrix $C_P$ is defined as:

$$C_P = [I0 - 2C_B^E[L_{I2G} \times]] \quad \text{(Eq. 13)}$$

The resulting cross product matrix in Eq. (13) operates against the attitude error in the inertial state error vector.

Note that more precise models may be incorporated. For instance, if pseudorange measurements are utilized, then the state error dynamics must be augmented to include a clock error model and the position measurements are augmented to include a clock bias. This example is included for brevity and clarity and is in no way limiting. Further, a similar matrix may be constructed for the use of velocity measurements or Doppler measurements from the GPS. If Doppler measurements are included, then the GPS clock bias error must be expanded to include a clock rate term and possibly a clock acceleration term.

Using the simple error model defined in Eq. (7) and combined with the dynamics defined in Eq. (12), a Global Extended Kalman Filter (GEKF) may be utilized to estimate the state error $\delta x$ as discussed further below. The state error may then be used to correct the a priori state estimate and improve the performance of the navigation solution. Note that GPS measurements are often available at a much lower rate than the IMU data. The IMU data is typically used to drive the strap down equations of motion. The error covariance of the GEKF is propagated at the same rate (or slower if computational limitations exist) as the IMU. When GPS measurements are available, the GPS is used to correct the IMU state. The state is then propagated forward in time using the IMU measurements until the next GPS measurement is available.

Correction of the Propagated Inertial States Using Differential GPS Measurements Differential GPS involves the difference between two sets of GPS measurement from different GPS receiver in relatively close proximity. Because of the resulting elimination of common mode errors, differential GPS is typically more accurate than conventional GPS. However, a disadvantage is that differential GPS measurements lose their absolute position information. Therefore a combination of absolute and relative GPS measurements may be utilized.

Given two sets of GPS measurements, for example, from GPS receivers 115 and 210, Eq. (12) takes on the following form:

$$\begin{bmatrix} \tilde{P}_{GPS1}^E \\ \tilde{P}_{GPS2}^E \end{bmatrix} = \begin{bmatrix} \overline{P}_{GPS1}^E \\ \overline{P}_{GPS2}^E \end{bmatrix} + \begin{bmatrix} C_{P1} & 0 \\ 0 & C_{P2} \end{bmatrix} \begin{bmatrix} \delta x_1 \\ \delta x_2 \end{bmatrix} + \begin{bmatrix} b_c \\ b_c \end{bmatrix} + \begin{bmatrix} v_1 \\ v_2 \end{bmatrix} \quad \text{(Eq. 14)}$$

Each of the measurements is independent of the other. However, they are both corrupted by the same common mode errors $b_c$. Using a rotation similar to the one employed Eq. (9), the relative state errors may modified to the following form:

$$\begin{bmatrix} \tilde{P}_{GPS1}^E \\ \Delta \tilde{P}_{GPS}^E \end{bmatrix} = $$

$$\begin{bmatrix} \overline{P}_{GPS1}^E \\ \Delta \overline{P}_{GPS}^E \end{bmatrix} + \begin{bmatrix} C_{P1} & 0 \\ C_{P1} - C_{P2} & C_{P2} \end{bmatrix} \begin{bmatrix} \delta x_1 \\ \delta \Delta x \end{bmatrix} + \begin{bmatrix} b_c \\ 0 \end{bmatrix} + \begin{bmatrix} v_1 \\ \Delta v \end{bmatrix} \quad \text{(Eq. 15)}$$

where a differential measurement is defined as $\Delta \tilde{P}_{GPS}^E = \tilde{P}_{GPS1}^E - \tilde{P}_{GPS2}^E$. The rotation removes the effect of the common mode errors in the relative measurements. This new measurement function combined with the dynamics of Eq. (9) can be used to define what is henceforward referred to as the Global Extended Kalman Filter (GEKF). The filter is referred to as a global filter since it incorporates the absolute and relative state of both vehicles and is corrected with the absolute and differential GPS measurements using the model in Eq. (15).

It will be appreciated that numerous modifications may be performed. For instance, raw pseudorange measurements from the GPS receiver may be used instead of position estimates. In this case, the state errors must be augmented with a GPS clock bias (as discussed before) but also with a relative clock bias estimate. If velocity or Doppler measurements are employed, then a state must be added for the clock drift and modeled appropriately. In addition, it is possible to process some or all of the available GPS measurements as they arrive. For instance, it is possible to process the absolute measurements in the GEKF without the differential measurements until such time as the differential GPS measurements from both vehicles arrive.

Correction of the Propagated Inertial States Using GPS Carrier Phase Measurements A very special subclass of measurements exists for GPS receivers equipped to provide carrier phase measurements because such measurements may be accurate to a few centimeters.

However, to achieve this accuracy, an integer ambiguity problem must be solved. Once solved, the differential carrier phase measurements may be integrated into the GEKF and processed accordingly. The integer ambiguity problem arises because an unknown integer number of wavelengths exists between each vehicle. This unknown integer is different for each satellite that both receivers track and must be estimated on a per-satellite basis. The integer ambiguity problem is typically solved from GPS antenna to GPS antenna on each vehicle. For a carrier phase of a given wavelength $\lambda$, the range to a GPS satellite i from a vehicle (designated as vehicle 1) is defined as:

$$\lambda(\hat{\phi}_1^i + N_1^i) = \overline{\rho}_1^i + \delta P_1^E + \tau + b_c + v_1 \quad \text{(Eq. 16)}$$

where the carrier phase measurement at receiver 1 for satellite i is defined as $\hat{\phi}_1^i$, the integer number of wavelengths between the receiver and satellite is $N_1^i$, and an a priori estimate of the range to the satellite is $\overline{\rho}_1^i$. This range is calculated from the known satellite locations and the a priori estimate of the GPS antenna either computed from the inertial state or from the GPS position estimates or the pseudorange measurements. The carrier phase measurement is corrupted by errors in the estimate of the GPS antenna position $\delta P_1^E$ that influences the error through a line of sight matrix $C_{LOS}^i$. This matrix is defined as the vector line of sight from the GPS antenna on vehicle 1 to satellite i. In addition, a GPS receiver clock bias r corrupts the measurements along with the receiver noise and common mode errors.

In the previous discussion, a single difference was defined as the difference between two GPS measurements from two different vehicles. Now a double difference is defined for the purpose of eliminating the common mode errors and the clock bias. The double difference is defined as:

$$\nabla \Delta \hat{\phi} = \hat{\phi}_1^i - \hat{\phi}_1^j - (\hat{\phi}_2^i - \hat{\phi}_2^j) \quad \text{(Eq. 17)}$$

In this case, satellite i and satellite j are different satellites currently in view by both receivers 1 and 2. The resulting measurement error is defined as:

$$\lambda(\nabla \Delta \hat{\phi} + \nabla \Delta N) = \nabla \Delta \overline{\rho} + (C_{LOS}^i - C_{LOS}^j) \Delta \delta P^E + \nabla \Delta v_\phi \quad \text{(Eq. 18)}$$

The definition of the double difference is applied to each term in Eq. (16). The common mode and receiver clock errors are now eliminated. A similar error model may be applied to create double differenced pseudorange GPS measurements.

$$\nabla \Delta \tilde{\rho} = \nabla \Delta \overline{\rho} + (C_{LOS}^i - C_{LOS}^j) \Delta \delta P^E + \nabla \Delta v_\rho \quad \text{(Eq. 19)}$$

Using the combination of these two measurements, it is possible to estimate the double differenced integer ambiguity and then utilize the double differenced carrier phase measurements in the GEKF. Several methods are available for performing this task. One way is to perform code minus carrier smoothing. Essentially, the difference between the pseudorange and carrier phase measurements is utilized to estimate the integer bias through averaging over time:

$$\nabla \Delta N = \frac{1}{\lambda} \nabla \Delta \tilde{\rho} - \nabla \Delta \tilde{\phi} \quad \text{(Eq. 20)}$$

Since $\nabla \Delta N$ is assumed constant, Eq. (20) is merely averaged over time until the covariance is sufficiently small.

A more complex and precise method is to utilize the Wald Test for the integer ambiguity problem. The Wald Test is a known statistical hypothesis testing scheme. In this case, a set of possible integer ambiguities is hypothesized and tested against the available GPS measurements. Using a combination of all of the available code and carrier phase measurements available to both GPS receivers, a set of residuals are constructed and used to estimate the probability that a particular hypothesis is correct. The residual formed as:

$$r_k = \begin{bmatrix} \lambda(\nabla\Delta\tilde{\phi} + \nabla\Delta N_k) - \nabla\Delta\tilde{\rho} \\ E\lambda(\nabla\Delta\tilde{\phi} + \nabla\Delta N_k) \end{bmatrix} \quad \text{(Eq. 21)}$$

In this equation, the residual $r_k$ is generated using a hypothesized integer ambiguity $\nabla\Delta N_k$ where k is the index number of the particular hypothesis. The measurements and residuals are now assumed to incorporate all of the satellites measurements available to both GPS receivers. The number of hypotheses can be quite large since a range of integers must be hypothesized for each satellite. A special function E is a matrix constructed as the left annihilator of the measurement sensitivity function. E is defined such that $$E(\nabla C_{LOS}) = 0 \quad \text{(Eq. 22)}$$

where $\nabla C_{LOS}$ is the collection of the line of sight vector differences. The residual $r_k$ has an assumed Gaussian probability density function, although the Wald Test allows for other densities to be utilized. If the integer hypothesis k is correct, then the residual will have a probability density function. Given a probability that the hypothesis is correct $F_k$, and assumed density function for the residual $f_k$, the Wald Test calculates the probability that the hypothesis is correct using the residuals in recursive manner.

$$F_k(t + \Delta t) = \frac{F_k(t) f_k(t + \Delta t)}{\sum_{k=0}^{L} F_k(t) f_k(t + \Delta t)} \quad \text{(Eq. 23)}$$

If the probability of one hypothesis $F_k(t+\Delta t)$ reaches one, then that hypothesis is declared the correct hypothesis. At this point the double differenced carrier phase measurements can be utilized in the GEKF. The measurement model is updated utilizing the following form:

$$\begin{bmatrix} \tilde{P}^E_{GPS1} \\ \Delta\tilde{P}^E_{GPS} \\ \lambda(\nabla\Delta\tilde{\phi}+\nabla\Delta N) \end{bmatrix} = \begin{bmatrix} \overline{P}^E_{GPS1} \\ \Delta\overline{P}^E_{GPS} \\ \nabla\Delta\overline{\rho} \end{bmatrix} + \begin{bmatrix} C_{P1} & 0 \\ C_{P1} - C_{P2} & C_{P2} \\ 0 & \nabla C_{P2} \end{bmatrix}\begin{bmatrix} \delta x_1 \\ \delta\Delta x \end{bmatrix} + \begin{bmatrix} b_c \\ 0 \\ 0 \end{bmatrix} + \begin{bmatrix} v_1 \\ \Delta v \\ \nabla\Delta v_\phi \end{bmatrix} \quad \text{(Eq. 24)}$$

This measurement function can now be used as part of the GEKF to estimate the relative and absolute state errors. It will be appreciated that this method applies for all of the different carrier phase wavelengths: for example, L1, L2, widelane, narrow lane, or any other linear combination. This above measurements may be modified to include double differenced code measurements as previously stated or to utilize again single differenced code or Doppler measurements provided that the state is augmented to incorporate the relative state error.

Sensor Fusion Through the Global Extended Kalman Filter (GEKF)

As discussed previously, Eq (9) provides a convenient format for mixing in measurements from sensors such as GPS sensors or EO sensors. For example, This sensor fusion process may use the measurement function of Eq. (24) so as to fuse in differential GPS measurements. Eq (9) is now repeated for convenience.

$$\begin{bmatrix} \delta\dot{x}_1 \\ \delta\Delta\dot{x} \end{bmatrix} = \begin{bmatrix} A_1 & 0 \\ A_1 - A_2 & A_2 \end{bmatrix}\begin{bmatrix} \delta x_1 \\ \delta\Delta x \end{bmatrix} + \begin{bmatrix} B_1 & 0 \\ B_1 & -B_2 \end{bmatrix}\begin{bmatrix} w_1 \\ \Delta w \end{bmatrix} \quad \text{(Eq. 25)}$$

The dynamics of Equation (25) are driven by noise processes $w_1$ and $\Delta w$. The GEKF assumes that each of these is a Gaussian process with the following statistics:

$$E\left[\begin{bmatrix} w_1 \\ \Delta w \end{bmatrix}\right] = 0; \quad \text{(Eq. 26)}$$

$$E\left[\begin{bmatrix} w_1 \\ \Delta w \end{bmatrix}[w_1 \;\; \Delta w]\right] = \begin{bmatrix} W_1 & W_1 \\ W_1 & W_1 + W_2 \end{bmatrix} = W_{GEKF}$$

where the covariance of the process noise for each inertial system is assumed independent of the other and have values denoted by $W_1$ and $W_2$. The term $E[\bullet]$ represents the taking of the statistical expectation value. The process noise is determined by the inertial measurement unit quality. The initial statistics for the error states are likewise:

$$E\left[\begin{bmatrix} \delta x_1 \\ \delta\Delta x \end{bmatrix}\right] = 0; \quad \text{(Eq. 27)}$$

$$E\left[\begin{bmatrix} \delta x_1 \\ \delta\Delta x \end{bmatrix}[\delta x_1 \;\; \delta\Delta x]\right] = \begin{bmatrix} P_1 & P_1 \\ P_1 & P_1 + P_2 \end{bmatrix} = P_{GEKF}$$

The dynamic matrix for the inertial error dynamics are grouped together into a common form as:

$$A_{GEKF} = \begin{bmatrix} A_1 & 0 \\ A_1 - A_2 & A_2 \end{bmatrix} \quad \text{(Eq. 28)}$$

The process noise sensitivity is defined as:

$$B_{EKF} = \begin{bmatrix} B_1 & 0 \\ B_1 & -B_2 \end{bmatrix} \quad \text{(Eq. 29)}$$

For a given time increment $\Delta t$, the state for each vehicle is integrated over time independently using Eq. (2) using a nonlinear integration method of choice such as Euler integration or a Runge-Kutta method. For example, the tanker may be referred to as vehicle 1 and have its state determined through integration of the following:

$$\dot{x}_1 = \begin{bmatrix} \dot{P}^E_1 \\ \dot{V}^E_1 \\ \dot{Q}^E_{B1} \end{bmatrix} \quad \text{(Eq. 30)}$$

-continued $$= \begin{bmatrix} V_1^E \\ C_{B1}^E a_1^{B1} - \omega_{IE}^E \times (\omega_{IE}^E \times P_1^E) - 2\omega_{IE}^E \times V_1^E + g_1^E \\ \frac{1}{2}[\Omega_{EB1}^{B1} \times]Q_{B1}^E \end{bmatrix}$$

In this case, all terms denoted with a subscript "1" denote those value or states experienced by the tanker. Similarly, the receiver aircraft may be denoted as vehicle 2 and have corresponding subscripts:

$$\dot{x}_2 = \begin{bmatrix} \dot{P}_2^E \\ \dot{V}_2^E \\ \dot{Q}_{B2}^E \end{bmatrix} \quad \text{(Eq. 31)}$$

$$= \begin{bmatrix} V_2^E \\ C_{B2}^E a_2^{B2} - \omega_{IE}^E \times (\omega_{IE}^E \times P_2^E) - 2\omega_{IE}^E \times V_2^E + g_2^E \\ \frac{1}{2}[\Omega_{EB2}^{B2} \times]Q_{B2}^E \end{bmatrix}$$

Each state is propagated forward at a user defined interval or at the interval that the IMU is updated. At each new time interval, the values for $\alpha_1^{B1}$ and $\omega_{IB1}^{B1}$ are updated using the best estimates or measurements of the acceleration and angular velocity for the first vehicle that are either estimated or measured from the IMU. Likewise, the values for $\alpha_2^{B2}$ and $\omega_{IB2}^{B2}$ are updated using the best estimates or measurements of the acceleration and angular velocity for the second vehicle. However, the error covariance is propagated in time using the dynamic model described. The propagation is done as:

$$M_{GEKF} = \Phi_{GEKF} P_{GEKF} (\Phi_{GEKF})^T + \Gamma_{GEKF} W_{GEKF} \Gamma_{GEKF}^T \quad \text{(Eq. 32)}$$

where state transition matrix $\Phi_{GEKF}$ is defined as follows:

$$\Phi_{GEKF} = e^{A_{GEKF}\Delta t} \quad \text{(Eq. 33)}$$

and where a discrete time process noise propagation matrix is defined as:

$$\Gamma_{GEKF} = \int_0^{\Delta t} e^{A_{GEKF}\tau} B_{EKF}(\tau) d\tau \quad \text{(Eq. 34)}$$

which may be approximated using appropriate means, if necessary.

The measurement model described for the GPS measurements is repeated:

$$\begin{bmatrix} \tilde{P}_{GPS1}^E \\ \Delta \tilde{P}_{GPS}^E \\ \lambda(\nabla \Delta \tilde{\phi} + \nabla \Delta N) \end{bmatrix} = \quad \text{(Eq. 35)}$$

$$\begin{bmatrix} \overline{P}_{GPS1}^E \\ \Delta \overline{P}_{GPS}^E \\ \nabla \Delta \overline{\rho} \end{bmatrix} + \begin{bmatrix} C_{P1} & 0 \\ C_{P1} - C_{P2} & C_{P2} \\ 0 & \nabla C_{P2} \end{bmatrix} \begin{bmatrix} \delta x_1 \\ \delta \Delta x \end{bmatrix} + \begin{bmatrix} b_c \\ 0 \\ 0 \end{bmatrix} + \begin{bmatrix} v_1 \\ \Delta v \\ \nabla \Delta v_\phi \end{bmatrix}$$

The measurement noise is lumped together and assumed to be Gaussian with the following statistics:

$$E\left[\begin{bmatrix} b_c + v_1 \\ \Delta v \\ \nabla \Delta v_\phi \end{bmatrix}\right] = 0; \quad \text{(Eq. 36)}$$

$$E\left[\begin{bmatrix} b_c + v_1 \\ \Delta v \\ \nabla \Delta v_\phi \end{bmatrix} \begin{bmatrix} b_c + v_1 & \Delta v & \nabla \Delta v_\phi \end{bmatrix}\right] =$$

$$\begin{bmatrix} V_{bc} + V_1 & V_1 & 0 \\ V_1 & V_1 + V_2 & 0 \\ 0 & 0 & V_\phi \end{bmatrix} = V_{GEKF}$$

The measurement sensitivity matrix is lumped together into a common matrix defined as:

$$C_{GEKF} = \begin{bmatrix} C_{P1} & 0 \\ C_{P1} - C_{P2} & C_{P2} \\ 0 & \nabla C_{P2} \end{bmatrix} \quad \text{(Eq. 37)}$$

Whenever a GPS measurement is available, the inertial states are propagated forward to the time of validity of the GPS measurements using the method outlined in Eq. (25) through Eq. (31). Then the GPS measurement is used to correct the state using the GEKF structure. The covariance is updated using the following covariance update formula:

$$P_{GEKF} = M_{GEKF} - M_{GEKF} C_{GEKF}^T (C_{GEKF} M_{GEKF} C_{GEKF}^T + V_{GEKF})^{-1} C_{GEKF} M_{GEKF} \quad \text{(Eq. 38)}$$

A Kalman gain K is then calculated as:

$$K = P_{GEKF} C_{GEKF}^T V_{GEKF}^{-1} \quad \text{(Eq. 39)}$$

The state correction can be calculated as:

$$\begin{bmatrix} \delta \hat{x}_1 \\ \delta \Delta \hat{x} \end{bmatrix} = K\left(\begin{bmatrix} \tilde{P}_{GPS1}^E \\ \Delta \tilde{P}_{GPS}^E \\ \lambda(\nabla \Delta \tilde{\phi} + \nabla \Delta N) \end{bmatrix} - \begin{bmatrix} \overline{P}_{GPS1}^E \\ \Delta \overline{P}_{GPS}^E \\ \nabla \Delta \overline{\rho} \end{bmatrix}\right) \quad \text{(Eq. 40)}$$

No a priori estimate of the error needs to be maintained since the correction is applied to the state estimate after each GPS measurement. The state is propagated forward in time using the nonlinear strap down equations of motion previously defined. The state corrections are defined in terms of the corrections for the navigation state:

$$\begin{bmatrix} \delta \hat{x}_1 \\ \delta \Delta \hat{x} \end{bmatrix} = \begin{bmatrix} \delta P_1^E \\ \delta V_1^E \\ \delta q_{B1}^{B1} \\ \delta P_1^E - \delta P_2^E \\ \delta V_1^E - \delta V_2^E \\ \delta q_{B1}^{B1} - \delta q_{B2}^{B2} \end{bmatrix} \quad \text{(Eq. 41)}$$

The first vehicle state is corrected in the following manner to get the updated estimate:

$$\begin{bmatrix} \hat{P}_1^E \\ \hat{V}_1^E \\ \hat{Q}_{B1}^E \end{bmatrix} = \begin{bmatrix} \overline{P}_1^E + \delta P_1^E \\ \overline{V}_1^E + \delta V_1^E \\ \overline{Q}_{B1}^E \otimes \hat{Q}_{B1}^{B1} \end{bmatrix} \quad \text{(Eq. 42)}$$

where a quaternion $\overline{Q}_{B1}^{E'}$ is the a priori attitude (before the GPS measurement is applied). The term (A⊗B) represents the standard rotation between two quaternions A and B. In this case, the a priori quaternion is corrected by applying the corrective rotation $\hat{Q}_{\hat{B}1}^{\overline{B}1}$ which is defined using the quaternion correction $\delta q_{B1}^{\overline{B}1}$ estimated from the GEKF.

$$\hat{Q}_{B1}^{B1} = \begin{bmatrix} 1.0 - \|\delta q_{B1}^{B1}\| \\ \delta q_{B1}^{B1} \end{bmatrix} \quad \text{(Eq. 43)}$$

Similarly, the state of the second vehicle is corrected using:

$$\begin{bmatrix} \hat{P}_2^E \\ \hat{V}_2^E \\ \hat{Q}_{B2}^E \end{bmatrix} = \begin{bmatrix} \overline{P}_2^E + \delta P_2^E \\ \overline{V}_2^E + \delta V_2^E \\ \overline{Q}_{B2}^E \otimes \hat{Q}_{B2}^{B2} \end{bmatrix} \quad \text{(Eq. 44)}$$

where:

$$\hat{Q}_{B2}^{B2} = \begin{bmatrix} 1.0 - \|\delta q_{B2}^{B2}\| \\ \delta q_{B2}^{B2} \end{bmatrix} \quad \text{(Eq. 45)}$$

Note that the process as shown assumed absolute position, single differenced position, and double differenced carrier phase measurements. If only some of these measurements are available, then the measurement sensitivity matrix $C_{GEKF}$ and measurement noise $V_{GEKF}$ are modified to include the proper number of measurements actually available and the processing proceeds as defined. Alternatively, the loosely coupled versions in which the GPS provides absolute position estimates rather than range measurements may be utilized by modifying the measurement function appropriately. Note also that the rate of propagation and correction do not have to be the same. The propagation process may be repeated numerous times between state updates copying $M_{GEKF}$ into $P_{GEKF}$ and propagating the states at the same rate.

Sensor Fusion Using EO Measurements

EO measurements form a redundant set of measurements for the relative state estimation error. The EO sensor typically operates on one vehicle and is utilized to image and provide measurements of the other vehicle or player. This EO system may be, for instance, utilized on the tanker to image a receiver aircraft and/or the boom. Typical EO measurements come in one of two forms. In a first form, the EO system provides bearings measurements (elevation and azimuth) from the sensor to a reference point on the imaged player. In a second form, the EO system attempts to perform pattern matching between an image of the player and a set of recorded images. The first form is referred to as reference point mapping. The second form is referred to as silhouette matching because the EO system attempts to match a possibly three-dimensional (3D) model to a two-dimensional image by first projecting the 3D model onto the assumed image plane and forming a two-dimensional silhouette.

To perform sensor fusion between the EO sensor and the inertial navigation state previously defined, the lever arm distance from the inertial state location on the vehicle to the reference point in view must be known. For example, with regard to reference points 1 through N of FIG. 2 for the receiver aircraft, corresponding body frame lever arms between the receiver aircraft's IMU and the reference points should be known. Using either EO technique or combinations thereof, the measurements are related back to the location of the inertial state of the vehicle. Further, the EO sensor itself is often located at a fixed lever arm from the imaging vehicle inertial reference point (for example, lever arm 135 for camera 130 of FIG. 1). The geometries of both vehicles must be known or estimated as part of this procedure in order to relate the image processing to the inertial navigation solutions. The measurement model of the vision system is defined relative to the inertial system on each system. The relative position between an EO sensor such as a camera and a given reference point is defined in terms of the relative position between each IMU in the ECEF coordinate frame as:

$$\Delta P_{iC}^E = P_i^E - P_C^E = P_{IMU2}^E + C_{\overline{B}_2}^E L_{2-i}^{\overline{B}_2} - P_{IMU1}^E - C_{\overline{B}_1}^E L_{1-C}^{\overline{B}_1} \quad \text{(Eq. 46)}$$

where the position of the camera in the ECEF coordinate frame is $P_C^E$, the position of the reference point i (such as one of reference points 1 through N of FIG. 2) on the target in the ECEF coordinate frame is $P_i^E$, and the relative position vector $\Delta P_{iC}^E$ is the difference between the two vectors. The relative position vector may be defined in terms of the secondary vehicle IMU state $P_{IMU2}^E$ in the ECEF coordinate frame plus the lever arm between the IMU and a reference location $L_{2-i}^{\overline{B}^2}$ that must be rotated from the vehicle body frame into the ECEF frame using a cosine rotation matrix $C_{\overline{B}_2}^E$. Likewise, the primary vehicle's IMU position is defined as $P_{IMU1}^E$ and is located relative to the camera system through the lever arm $L_{1-C}^{\overline{B}_1}$ rotated from the primary vehicle body frame to the ECEF coordinate frame through cosine rotation matrix $C_{\overline{B}_1}^E$. Both $C_{\overline{B}_2}^E$ and $C_{\overline{B}_1}^E$ are calculated using the attitude of the respective vehicle. This relationship relates the camera system to the associated inertial measurement unit through a reference frame that is common to the camera system, the IMU, and also the GPS system. Finally, a measurement model can be constructed which incorporates the GEKF state estimates and enables the integration of the camera system within the existing GEKF structure. A relative position vector in the camera frame is defined as:

$$\Delta P_{iC}^C = \begin{bmatrix} \Delta X_{iC}^C \\ \Delta Y_{iC}^C \\ \Delta Z_{iC}^C \end{bmatrix} = \begin{bmatrix} x_1^C - x_{2i}^C \\ y_1^C - y_{2i}^C \\ z_1^C - z_{2i}^C \end{bmatrix} \quad \text{(Eq. 47)}$$

Each of the terms is one component of the relative position vector between the camera lens and the reference point on the receiver related in the camera reference frame.

EO Bearing Measurements

The measurements from an EO system may provide complete position estimates to active beacons or a camera system may simply identify points and provide bearings measurements from the camera to the reference point. Bearings measurements may be made up of two angles defined as:

$$\begin{bmatrix} \tilde{\alpha}_{iC} \\ \tilde{\beta}_{iC} \end{bmatrix} = \begin{bmatrix} \tan^{-1}\left(\frac{\Delta Z_{iC}^C}{\Delta X_{iC}^C}\right) \\ \tan^{-1}\left(\frac{\Delta Y_{iC}^C}{\Delta X_{iC}^C}\right) \end{bmatrix} + \begin{bmatrix} v_\alpha \\ v_\beta \end{bmatrix} \quad \text{(Eq. 47a)}$$

where $C_E^C$ $\alpha_{iC}$ represents the azimuth angle of the reference point i relative to the camera C in the camera frame, and $\beta_{iC}^C$ represents the elevation angle of the target. The additive noise terms are zero mean, Gaussian with noise variance associated with the error models described previously including pixel noise and blurring effects. Each of the terms is one component of the relative position vector between the camera lens and the reference point on the receiver related in the camera reference frame.

A Modified Gain Extended Kalman Filter (MGEKF) may be used to translate the elevation and azimuth angles to a Cartesian position error in the camera frame. Advantageously, this filter will have zero mean steady state error. The error function for the measurements (in the EO sensor frame) is now defined. First, the residual process is defined as the difference between the measured and a priori estimates of the angles as:

$$r_i = \begin{bmatrix} \alpha_i - \overline{\alpha}_i \\ \beta_i - \overline{\beta}_i \end{bmatrix} \quad \text{(Eq. 48)}$$

$$= \begin{bmatrix} \tan^{-1}\left(\frac{y_1^C - y_{2i}^C}{x_1^C - x_{2i}^C}\right) - \tan^{-1}\left(\frac{\overline{y}_1^C - \overline{y}_{2i}^C}{\overline{x}_1^C - \overline{x}_{2i}^C}\right) \\ \tan^{-1}\left(\frac{z_1^C - z_{2i}^C}{x_1^C - x_{2i}^C}\right) - \tan^{-1}\left(\frac{\overline{z}_1^C - \overline{z}_{2i}^C}{\overline{x}_1^C - \overline{x}_{2i}^C}\right) \end{bmatrix} \square \begin{bmatrix} \tan^{-1}(\Theta) \\ \tan^{-1}(\Psi) \end{bmatrix}$$

where the angles $\Theta$ and $\Psi$ are defined using the following relationship:

$$\tan^{-1}(a) - \tan^{-1}(b) = \tan^{-1}\left(\frac{a-b}{1+ab}\right) \quad \text{(Eq. 49)}$$

Therefore the residual process may be re-written in the following way:

$$r_i = \begin{bmatrix} \tilde{\alpha}_i - \overline{\alpha}_i \\ \tilde{\beta}_i - \overline{\beta}_i \end{bmatrix} \quad \text{(Eq. 50)}$$

$$= \begin{bmatrix} -D_1 \tan^{-1}(\Theta)/\Theta & 0 \\ 0 & -D_2 \tan^{-1}(\Psi)/\Psi \end{bmatrix}$$

$$\begin{bmatrix} \sin(\tilde{\alpha}_i) & 0 & -\cos(\tilde{\alpha}_i) \\ \sin(\tilde{\beta}_i) & -\cos(\tilde{\beta}_i) & 0 \end{bmatrix} \begin{bmatrix} x_1^C - x_{2i}^C \\ y_1^C - y_{2i}^C \\ z_1^C - z_{2i}^C \end{bmatrix}$$

where:

$$D_1 = 1/[\cos(\tilde{\alpha}_i)(\overline{x}_1^C - \overline{x}_{2i}^C) + \sin(\tilde{\alpha}_i)(\overline{z}_1^C - \overline{z}_{2i}^C)] \quad \text{(Eq. 51)}$$
$$D_2 = 1/[\cos(\tilde{\beta}_i)(\overline{x}_1^C - \overline{x}_{2i}^C) + \sin(\tilde{\beta}_i)(\overline{y}_1^C - \overline{y}_{2i}^C)]$$

The modified gain for the measurement function may be defined as:

$$H_{MGEKFi} = \begin{bmatrix} -D_1 \tan^{-1}(\Theta)/\Theta & 0 \\ 0 & -D_2 \tan^{-1}(\Psi)/\Psi \end{bmatrix} \quad \text{(Eq. 52)}$$

The line of sight matrix formed directly from the measurements $$H_{Los\_i} = \begin{bmatrix} \sin(\tilde{\alpha}_i) & 0 & -\cos(\tilde{\alpha}_i) \\ \sin(\tilde{\beta}_i) & -\cos(\tilde{\beta}_i) & 0 \end{bmatrix} \quad \text{(Eq. 53)}$$

The error in the bearings measurements in the camera frame may now be written as:

$$\begin{bmatrix} \tilde{\alpha}_i - \overline{\alpha}_i \\ \tilde{\beta}_i - \overline{\beta}_i \end{bmatrix} = H_{MGEKFi} H_{Los\_i} \begin{bmatrix} x_1^C - x_{2i}^C \\ y_1^C - y_{2i}^C \\ z_1^C - z_{2i}^C \end{bmatrix} \quad \text{(Eq. 54)}$$

In this fashion, the measurement model becomes:

$$\begin{bmatrix} \tilde{\alpha}_{iC} \\ \tilde{\beta}_{iC} \end{bmatrix} - \begin{bmatrix} \overline{\alpha}_{iC} \\ \overline{\beta}_{iC} \end{bmatrix} = H_{MGEKFi} H_{Los\_i} H_{IMUtoC} \begin{bmatrix} \delta x_1 \\ \delta \Delta x \end{bmatrix} + \begin{bmatrix} v_\alpha \\ v_\beta \end{bmatrix} \quad \text{(Eq. 55)}$$

In the above discussion, the a priori values for the angles are calculated using the a priori state estimates from the GEKF. The matrix $H_{Los\_i}$ has the line-of-sight vector for the ith reference point and the matrix $H_{MGEKF}$ is generated as part of the MGEKF and is designed such that the residual calculated is zero mean in the ECEF Cartesian coordinate frame. Finally, the matrix $H_{IMUtoC}$ is a matrix which translates the inertial error states of the Global Extended Kalman Filter to the position error in the camera frame and is similar to the GPS measurement matrix but utilizing the camera and reference frame lever arms instead of the lever arms to the GPS antenna. This measurement model therefore relates the camera system elevation and azimuth angles of the reference point to the error in the inertial system on the primary vehicle as the camera as well as the relative inertial error between the primary vehicle and the secondary vehicle.

The matrix $H_{IMUtoC}$ is defined using a similar methodology as the translation from the IMU to the GPS antenna location. However, the results are not as trivial. To estimate the error between each inertial frame in the EO sensor reference frame defined in Eq. (47), the perturbation must be taken around the relative state vector:

$$\Delta P_{iC}^C = C_{B_1}^C C_E^{B_1}(P_i^E - P_C^E) = C_{B_1}^C C_E^{B_1}(P_2^E + C_{B_2}^E L_{2-i}^{B_2} - P_1^E - C_{B_1}^E L_{1-C}^{B_1}) \quad \text{(Eq. 56)}$$

In this case, the lever arms $L_{2-i}^{B_2}$ and $L_{1-C}^{B_1}$ are assumed known as is the orientation of the camera relative to the inertial system on vehicle 1, $C_{B1}^E$.

The following perturbations are defined as:

$$P_1^E = \overline{P}_1^E + \delta P_1 \quad \text{(Eq. 57)}$$

$$P_2^E = \overline{P}_2^E + \delta P_2 \quad \text{(Eq. 58)}$$

$$C_{B1}^E = C_{\overline{B}1}^E(I + 2[\delta q_{B1}^{\overline{B}1} \times]) \quad \text{(Eq. 59)}$$

$$C_{B2}^E = C_{\overline{B}2}^E(I + 2[\delta q_{B2}^{\overline{B}2} \times]) \quad \text{(Eq. 60)}$$

Then the perturbations are substituted back into Eq. (56) to form:

$$\Delta P_{iC}^C = C_{B_1}^C (I - 2[\delta q_1 \times]) C_E^{\bar{B}_1} (\bar{P}_2^E + \delta P_2 - \bar{P}_1^E - \delta P_1) - \quad \text{(Eq. 61)}$$
$$C_{B_1}^V L_{1-C}^{B_1} + C_{B_1}^C (I - 2[\delta q_1 \times]) C_E^{\bar{B}_1} C_{\bar{B}_2}^E (I + 2[\delta q_2 \times]) L_{2-i}^{B_2} -$$
$$\left( C_{B_1}^V C_E^{B_1} (\bar{P}_2^E - \bar{P}_1^E) - C_{B_1}^C L_{1-C}^{B_1} + C_{B_1}^C C_E^{\bar{B}_1} C_{\bar{B}_2}^E L_{2-i}^{B_2} \right)$$

Regrouping the terms of Eq. (61) into the GEKF state space and excluding higher order terms of perturbations produces:

$$\Delta P_{iC}^C \approx \Delta \bar{P}_{iC}^C + C_{B_1}^C \begin{bmatrix} 0 & 0 & H_{Q1} & C_E^{\bar{B}_1} & 0 & (H_{Q1} + H_{Q2}) \end{bmatrix} \begin{bmatrix} \delta P_1 \\ \delta V_1 \\ \delta q_{B_1}^{B_1} \\ \Delta \delta P \\ \Delta \delta V \\ \Delta \delta q \end{bmatrix} \quad \text{(Eq. 62)}$$

The a priori estimate $\Delta \bar{P}_{iC}^C$ is defined as:

$$\Delta \bar{P}_{iC}^C = C_{B_1}^C C_E^{\bar{B}_1}(\bar{P}_2^E + C_{\bar{B}_2}^E L_{2-i}^{B_2} - \bar{P}_1^E - C_{\bar{B}_1}^E L_{1-C}^{B_1}) \quad \text{(Eq. 63)}$$

The term $H_{Q1}$ is defined as:

$$H_{Q1} = 2([C_E^{\bar{B}_1}(\bar{P}_1^E - \bar{P}_2^E) \times] + [(C_E^{\bar{B}_1} C_{\bar{B}_2}^E L_{2-i}^{B_2}) \times]) \quad \text{(Eq. 64)}$$

The term $H_{Q2}$ is defined as:

$$H_{Q2} = 2 C_E^{\bar{B}_1} C_{\bar{B}_2}^E [(L_{2-i}^{B_2}) \times] \quad \text{(Eq. 65)}$$

A notable portion of Eq. (62) is that, since the camera measurements are related through the inertial frame, the term $H_{Q1}$ actually provides limited observability of the error in the absolute state of vehicle 1. In other words, the absolute state of vehicle 1 relative to the Earth is observable through the camera measurements. This additional observability is a direct result of the fact that the camera measurements which provide relative state information are related through a common inertial reference frame.

A matrix $H_{IMU2C}$ may be defined as:

$$H_{IMU2C} = C_{B_1}^C [00 H_{Q1} C_E^{\bar{B}_1} 0 (H_{Q1} + H_{Q2})] \quad \text{(Eq. 66)}$$

The measurement function in Eq. (55) is sufficient to provide relative navigation solutions to the GEKF previously defined given sufficient numbers of reference points. Each reference point may take the form of an active beacon on the viewed vehicle or a small, recognizable portion of the vehicle with known location relative to the inertial system.

EO Silhouette Matching Measurements

A single silhouette measurement produces a complete state of the following form:

$$\tilde{y}_i = \begin{bmatrix} \tilde{\rho}_i \\ \tilde{\alpha}_i \\ \tilde{\beta}_i \\ Q_{B_2}^C \end{bmatrix} \quad \text{(Eq. 67)}$$

where $\tilde{\alpha}_i$ and $\tilde{\beta}_j$ have the same angle definition as before. The new variable $\rho_i$ represents the scalar range from the vision system to the target along the vector line defined by $\tilde{\alpha}_i$ and $\tilde{\beta}_j$. The quaternion is the estimated attitude of the target relative to the camera system.

The total measurement equation is:

$$\begin{bmatrix} \tilde{\rho}_i \\ \tilde{\alpha}_i \\ \tilde{\beta}_i \end{bmatrix} = \begin{bmatrix} \bar{\rho}_i \\ \bar{\alpha}_i \\ \bar{\beta}_i \end{bmatrix} + \begin{bmatrix} H_{\rho i} \\ H_{C\alpha} \\ H_{C\beta} \end{bmatrix} H_{IMU2C} \begin{bmatrix} \delta x_1 \\ \delta \Delta x \end{bmatrix} + \begin{bmatrix} v_\rho \\ v_\alpha \\ v_\beta \end{bmatrix} \quad \text{(Eq. 68)}$$

The a priori relative range measurement is calculated as the norm of the relative state vector or:

$$\bar{\rho} = \|\Delta P_{iC}^C\| \quad \text{(Eq. 69)}$$

Here, the range measurement matrix $H_{\rho i}$ is defined as:

$$H_{\rho i} = \begin{bmatrix} \dfrac{\Delta \bar{X}_{iC}^C}{\|\Delta \bar{P}_i^C\|} & \dfrac{\Delta \bar{Y}_{iC}^C}{\|\Delta \bar{P}_i^C\|} & \dfrac{\Delta \bar{Z}_{iC}^C}{\|\Delta \bar{P}_i^C\|} \end{bmatrix} \quad \text{(Eq. 70)}$$

The combined bearings measurement matrices are equivalent to the previous forms as:

$$\begin{bmatrix} H_{C\alpha} \\ H_{C\beta} \end{bmatrix} = H_{MGEKF} H_{LOS\_i} \quad \text{(Eq. 71)}$$

The matrix $H_{IMU2C}$ is as defined in Eq. (66).

The error from the attitude is treated separately since the residual is a set of relative attitude angles and is not related to the relative distance as the range, azimuth, and elevation are related to range. The attitude determined from an image defines the rotation from the vehicle body frame of the imaged vehicle to the camera frame. The measurement function is nonlinear:

$$\tilde{C}_{B_2}^C = C_{\bar{B}_2}^C (I + 2[\delta q_2 \times])(I + [v_q \times]) \quad \text{(Eq. 72)}$$

In this case, the term $\tilde{C}_{B_2}^C$ is the rotation matrix determined from the estimated relative yaw, pitch and roll of the imaged vehicle in the camera produced image. The a priori estimate of the rotation is $C_{\bar{B}_2}^C$. Two errors are associated with the rotation. The first is due to the error in the estimate of the imaged vehicle. This is comprised of the usual attitude quaternion perturbation $\delta q_2$. An additional, nonlinear rotation error is due to errors in the image processing $v_q$. The measurement equation may be re-written in terms of a linearized residual in which higher order terms of the rotation error and noise are neglected:

$$r_q = \begin{bmatrix} \left(\tilde{C}_{B_2}^C C_C^{\bar{B}_2}\right)_{32} \\ \left(\tilde{C}_{B_2}^C C_C^{\bar{B}_2}\right)_{13} \\ \left(\tilde{C}_{B_2}^C C_C^{\bar{B}_2}\right)_{21} \end{bmatrix} \quad \text{(Eq. 73)}$$
$$= H_q \begin{bmatrix} \delta x_1 \\ \delta \Delta x \end{bmatrix} + \begin{bmatrix} v_\Phi \\ v_\Theta \\ v_\Psi \end{bmatrix}$$

where the form $(\tilde{C}_{\bar{B}_2}^C C_C^{\bar{B}_2})_{ij}$ is the ith row and jth column of the 3×3 matrix $\tilde{C}_{\bar{B}_2}^C C_C^{\bar{B}_2}$.

The quaternion measurement matrix $H_q$ is simply defined as:

$$H_q = [002I00 - 2I] \quad \text{(Eq. 74)}$$

The measurement noise $v_q$ is decomposed into the axial components as:

$$v_q = \begin{bmatrix} v_\Phi \\ v_\Theta \\ v_\Psi \end{bmatrix} \quad \text{(Eq. 75)}$$

Therefore, the residual is formed using Eq. (73) and the associated error models. The error models are then utilized to form and correct the GEKF already defined.

Note that the above algorithm assumes that vehicle 1 images vehicle 2 using either reference points or silhouette matching. However, it is trivial to expand the results to include additional measurements of vehicle 2 imaging vehicle 1. For example, the receiver aircraft may include a camera (not illustrated in FIG. 2). Further, multiple silhouettes may be generated for different parts of the vehicle or player in view. Using either bearings only with multiple reference points or a silhouette matching scheme or combinations thereof, it is possible to use the measurement models defined in Eq. (68) and/or Eq. (55) to correct the inertial errors with error modeling defined in Eq. (15). Finally, the results may be simplified to the case where only a range measurement is available.

Processing Additional Sensor Measurements Through the GEKF

The Global Extended Kalman Filter (GEKF) has been defined for processing the GPS, EO, and INS measurements. However, the GEKF may be extended to include additional measurements such as relative range, bearings measurements, and relative attitude that may be provided from an Electro-Optic sensor or vision processing. The measurement functions derived can be used to correct the GEKF presented previously. The complete measurement function becomes:

$$\begin{bmatrix} \tilde{p}_i - \bar{p}_i \\ \tilde{\alpha}_i - \bar{\alpha}_i \\ \tilde{\beta}_i - \bar{\beta}_i \\ r_q \end{bmatrix} = \begin{bmatrix} H_{\rho i} H_{IMU2C} \\ H_{C\alpha} H_{IMU2C} \\ H_{C\beta} H_{IMU2C} \\ H_q \end{bmatrix} \begin{bmatrix} \delta x_1 \\ \delta \Delta x \end{bmatrix} + \begin{bmatrix} v_\rho \\ v_\alpha \\ v_\beta \\ v_q \end{bmatrix} \quad \text{(Eq. 76)}$$

The measurement noise is assumed to be Gaussian with the following statistics.

$$E\left[\begin{bmatrix} v_\rho \\ v_\alpha \\ v_\beta \\ v_q \end{bmatrix}\right] = 0; \quad E\left[\begin{bmatrix} v_\rho \\ v_\alpha \\ v_\beta \\ v_q \end{bmatrix} [v_\rho \; v_\alpha \; v_\beta \; v_q]\right] = V_{EO} \quad \text{(Eq. 77)}$$

Note that $V_{EO}$ is a covariance which contains any and all of the correlations between the noise processes, as determined by the method utilized to generate the range, angles, and attitude measurements. It is up to the designer to select appropriate values for $V_{EO}$. Likewise, the measurement sensitivity is grouped together into a single matrix for convenience of notation:

$$H_{EO} = \begin{bmatrix} H_{\rho i} H_{IMU2C} \\ H_{C\alpha} H_{IMU2C} \\ H_{C\beta} H_{IMU2C} \\ H_q \end{bmatrix} \quad \text{(Eq. 78)}$$

Therefore, the GEKF can be modified to include the vision system measurements. The inertial navigation state is propagated forward in time by an amount $\Delta t$ using the process and methods described in Eq. (25) through Eq. (34). At that time, if GPS measurements are available, the navigation state may be updated and corrected using the GPS measurement function and EKF corrections outlined in Eq. (35) through Eq. (45). After the state and covariance are updated, the system may check for EO measurements. If GPS measurements were available and applied, then the state is the most up to date state using the most recent GPS and IMU measurements. The covariance $P_{GEKF}$ is copied into $M_{GEKF}$ before processing the EO measurements.

If electro-optic (EO) sensor measurements are available, then the following method may be used to correct the navigation state through a GEKF process with or without GPS measurements. First, the covariance is updated using the following method:

$$P_{GEKF} = M_{GEKF} - M_{GEKF} H_{EO}{}^T (H_{EO} M_{GEKF} H_{EO}{}^T + V_{EO})^{-1} H_{EO} M_{GEKF} \quad \text{(Eq. 79)}$$

The Kalman Gain is then calculated as:

$$K = P_{GEKF} H_{EO}{}^T V_{EO}{}^{-1} \quad \text{(Eq. 80)}$$

The state correction can be calculated as:

$$\begin{bmatrix} \delta \hat{x}_1 \\ \delta \Delta \hat{x} \end{bmatrix} = K \left( \begin{bmatrix} \tilde{p}_i - \bar{p}_i \\ \tilde{\alpha}_i - \bar{\alpha}_i \\ \tilde{\beta}_i - \bar{\beta}_i \\ r_q \end{bmatrix} \right) \quad \text{(Eq. 81)}$$

No a priori estimate of the error needs to be maintained since the correction is applied to the state estimate. The state corrections are defined in terms of the corrections for the navigation state:

$$\begin{bmatrix} \delta \hat{x}_1 \\ \delta \Delta \hat{x} \end{bmatrix} = \begin{bmatrix} \delta P_1^E \\ \delta V_1^E \\ \delta q_{B1}^{B1} \\ \delta P_1^E - \delta P_2^E \\ \delta V_1^E - \delta V_2^E \\ \delta q_{B1}^{B1} - \delta q_{B2}^{B2} \end{bmatrix} \quad \text{(Eq. 82)}$$

The correction process is applied as discussed for Eq. (42) through Eq. (45). Note that this correction may take place even if GPS measurements are not available. In this case, the INS states and covariances are propagated forward in time to the current reference time of the EO measurements utilizing the INS data. Then the EO measurement correction process is applied. Similarly, this correction process may take place before the GPS measurements are utilized to correct the state provided that the navigation state and covariance was corrected with the EO measurements before processing the GPS. Finally, a third option is that the measurement functions and noise covariances from both the EO and GPS measurements available are combined into one single update function for the GEKF. This last segment only applies if the GPS and EO measurements have the same reference time for the measurements. Otherwise, the state must be propagated forward in time to the next measurement whether it is the EO or GPS measurements.

Processing Radio Ranging Measurements Through the GEKF

Measurements from radio ranging devices or radio bearings devices may be used in the GEKF. In this case, the radio provides a measurement of the relative range to the other vehicle radio. Multiple antennae may provide elevation and/or azimuth angles from the first vehicle to the relative vehicle. Such applications include data links which provide range using time delay of arrival schemes or Auto Collision Avoidance Systems which attempt which provide time delay of arrival of message or angles to the source of a transmission. The measurement model is simply modified to include only those measurements present. Instead of an EO sensor, the measurements are taken at the radio antenna which must be referenced relative to the IMU in the same way that the EO sensor lever arm was defined. In other words $L_{1\text{-}C}^{B_1}$ becomes the vector arm from the IMU to the radio antenna rather than the camera. Further, if elevation and azimuth are defined relative to an antenna, the relative attitude between the antenna and the inertial must be defined. In other words, $C_{B_1}{}^C$ is replaced with the rotation matrix from the IMU body frame to the antenna frame which should be constant for a rigid body. Likewise, the antenna location on the second vehicle must be surveyed relative to the second vehicle IMU. In other words, $L_{2\text{-}i}^{B_2}$ is replaced with the lever arm from the IMU on the second vehicle to the radio antenna on the second vehicle. Using these three replacements, the measurement models remain valid and may be utilized to incorporate radio ranging from antenna to antenna on different vehicles.

Fault Detection

Figure 3:
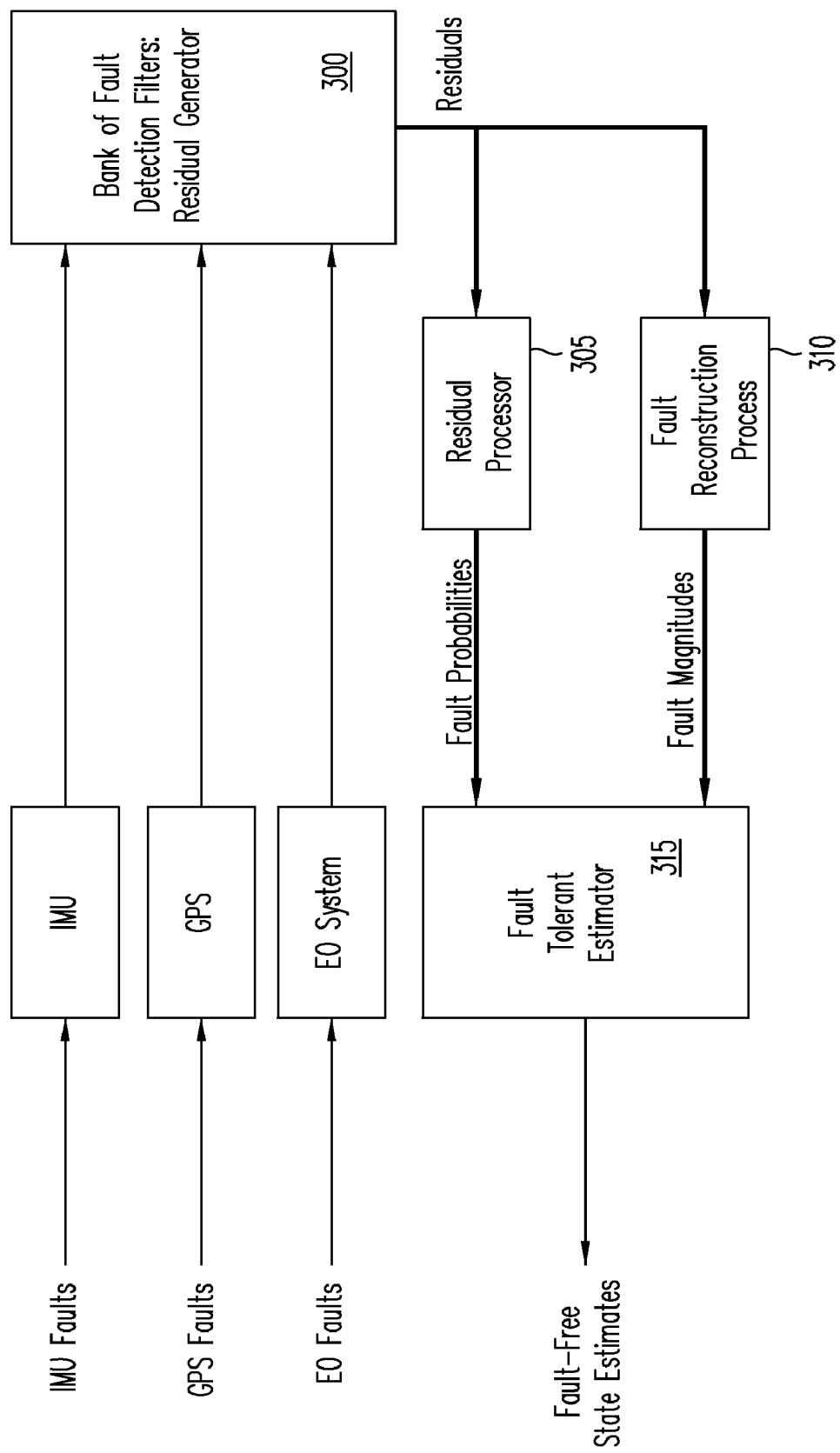
FIG. 3 illustrates a fault detection and reconfiguration process for the automated refueling boom control system of FIGS. 1 and 2.

As discussed with regard to FIGS. 1 and 2, a statistically optimal automatic control methodology has been disclosed for the control of an aerial refueling boom. But it may be the case that sensor measurements are defective. For example, GPS signal errors include but are not limited to multi-path, satellite transmission errors, or simply low signal-to-noise due to partial blockage by the tanker. A receiver failure can be caused by a variety of factors, from signal blockage by the tanker to combat damage. Only the detection of more subtle GPS signal errors are discussed below since the detection of a failed receiver is trivial with such methods as utilizing watchdog timers on the output of the receiver. Turning now to FIG. 3, a fault detection and reconfiguration process is outlined. A bank of fault detection filters and residual generator 300 processes measurements from, for example, an IMU, a GPS receiver, and an EO system. Residuals from generator 300 are processed in a residual processor 305 and a fault reconstruction process 310 to provide fault probabilities and fault magnitudes, respectively. A fault tolerant estimator 315 processes the fault probabilities and fault magnitudes to provide fault-free inertial navigation state estimates. The fault estimation and reconfiguration process of FIG. 3 will be more fully explained below.

Absolute GPS Fault Detection

GPS signal errors introduce an effective, unknown bias on one of the GPS satellite range and/or carrier phase measurements relative to the other GPS measurements. A least squares approach may be used to detect and isolate failures in a single GPS satellite measurement and isolate it from the remaining GPS measurement sets. For example, a Multiple Hypothesis Shiryayev Sequential Probability Ratio Test (MHSSPRT) may be used for detection and isolation of these errors (this test is described further below).

A least squares GPS navigation solution is well known. The pseudo range measurements from four or more visible GPS satellites are combined to form an estimate of the GPS receiver position and clock bias relative to the GPS constellation. Given n satellites, the navigation solution can be computed with (n−1) satellites, cycling through the satellites to create (n−1) solutions. Comparing the residual of these solutions over time using the SSRPT creates a probability distribution that indicates the likelihood of a satellite failure. When the probability that a satellite is failing reaches 99.9% or a required alert probability, an alarm is triggered and the satellite is no longer used for computation of the navigation state.

The range from a GPS receiver to a satellite i is denoted by the symbol $\rho_i$ and defined as:

$$\rho_i = \sqrt{(X_i-x)^2+(Y_i-y)^2+(Z_i-z)^2}+c\tau \quad \text{(Eq. 83)}$$

The range measurement is a function of a satellite position vector $P_i^E$, a receiver position vector $\overline{P}^E$, and a receiver clock bias $\tau$. The variable c represents the speed of light and converts a clock bias in seconds to a range. The satellite position vector in the ECEF coordinate frame is defined as:

$$P_i^E = \begin{bmatrix} X_i \\ Y_i \\ Z_i \end{bmatrix} \quad \text{(Eq. 84)}$$

The receiver position in the Earth Centered Earth Fixed coordinate frame is defined as:

$$P^E = \begin{bmatrix} x \\ y \\ z \end{bmatrix} \quad \text{(Eq. 85)}$$

Given an a priori estimate of the receiver position and clock bias, the estimated range to the satellite is given by:

$$\overline{\rho} = \sqrt{(X_i-\overline{x})^2+(Y_i-\overline{y})^2+(Z_i-\overline{z})^2}+c\overline{\tau} \quad \text{(Eq. 86)}$$

In this case the terms denoted by (‾) represent a priori estimates. The estimated range is in error and a linear perturbation defines the error between the estimated range and the true range.

$$\rho_i = \overline{\rho}_i + H_i \delta x \quad \text{(Eq. 87)}$$

where the variable $\delta x$ is the perturbed error in the state and consists of a perturbation in the state estimate which is to be estimated. The perturbation is defined as truth minus the estimated, or:

$$\delta x = \begin{bmatrix} x \\ y \\ z \\ c\tau \end{bmatrix} - \begin{bmatrix} \overline{x} \\ \overline{y} \\ \overline{z} \\ c\overline{\tau} \end{bmatrix} \quad \text{(Eq. 88)}$$

A line of sight matrix $H_i$ is defined as:

$$H_i = \begin{bmatrix} \dfrac{(X_i-\overline{x})}{\|P_i^E-\overline{P}\|} & \dfrac{(Y_i-\overline{y})}{\|P_i^E-\overline{P}\|} & \dfrac{(Z_i-\overline{z})}{\|P_i^E-\overline{P}\|} & 1 \end{bmatrix} \quad \text{(Eq. 89)}$$

where the term $\|\cdot\|$ denotes the 2-norm (sum of the squares) of the vector. From these definitions, a set of GPS measurements may be defined as:

$$\tilde{\rho}_i = \overline{\rho}_i + H_i \delta x + \mu_i + v_i + b_i \quad \text{(Eq. 90)}$$

The GPS measurement of range $\tilde{\rho}$ is corrupted by random noise $v_i$ which is zero mean and has variance $V_i$, as well as common mode errors $b_i$ which include ionosphere and troposphere errors. The common mode errors are typically not zero mean, but are nearly the same for two GPS receivers within close proximity. In addition, an unknown fault $\mu_i$ may exist in the measurement such as multipath. A goal is to estimate the state error $\delta x$ using a set of measurements $\tilde{\rho}$, one of which may include a fault $\mu_i$ in the ith measurement, and then detect and isolate the satellite with the fault. In the following discussion, only one satellite fault is assumed.

The tanker and receiver aircraft may each receive a set of GPS measurements of the form in Eq. (90).

$$\tilde{\rho}_{tank} = \overline{\rho}_{tank} + H_{tank}\delta x_{tank} + \nu_{tank} \quad \text{(Eq. 91)}$$

$$\tilde{\rho}_{rec} = \overline{\rho}_{rec} + H_{rec}\delta x_{rec} + \nu_{rec} \quad \text{(Eq. 92)}$$

The common mode errors and fault modes are neglected for the moment. A weighted least squares solution is provided for the receiver and tanker aircraft below. The solutions presented represent the best estimate of the error for each vehicle using only the data available from each GPS receiver and assuming zero mean, Gaussian noise from each receiver.

$$\delta \hat{x}_{tank} = (H_{tank}^T V_{tank}^{-1} H_{tank}) H_{tank}^T V_{tank}^{-1} (\tilde{\rho}_{tank} - \overline{\rho}_{tank}) \quad \text{(Eq. 93)}$$

$$\delta \hat{x}_{rec} = (H_{rec}^T V_{rec}^{-1} H_{rec}) H_{rec}^T V_{rec}^{-1} (\tilde{\rho}_{rec} - \overline{\rho}_{rec}) \quad \text{(Eq. 94)}$$

The state estimates are then updated according to the following:

$$\hat{x}_{tank} = \overline{x}_{tank} + \delta \hat{x}_{tank} \quad \text{(Eq. 95)}$$

$$\hat{x}_{rec} = \overline{x}_{rec} + \delta \hat{x}_{rec} \quad \text{(Eq. 96)}$$

From the state, a posteriori residual may be formed in which the fault signal is now assumed to be present.

$$r = \tilde{\rho} - \overline{\rho} - H\delta \hat{x} - \mu_i - \nu_i \quad \text{(Eq. 97)}$$

A projector P is formed such that PH=0. For the matrix P to exist, the number of available satellites must be greater than 4; the size of the perturbed state space. Using this projector and assuming a no fault condition, then the residual may be modified as:

$$Pr = P(\tilde{\rho} - \overline{\rho} - H\delta\hat{x} - \mu_i - \nu) = P(\tilde{\rho} - \overline{\rho} - \mu_i - \nu) \quad \text{(Eq. 98)}$$

In sum, the effect of the estimation error has been annihilated, and assuming a reasonable first estimate ($\tilde{\rho} - \overline{\rho} \approx 0$), then Eq. (98) becomes:

$$Pr = P(\nu + \mu_i) \quad \text{(Eq. 99)}$$

If no fault exists ($\mu_i$=0), then the statistics of Eq. (99) are zero mean and Gaussian with covariance V. The projector P has a null space equal to the size of the state space $\delta \hat{x}$. This may be removed from the residual since it is not relevant. The projector may be decomposed as:

$$P = \begin{bmatrix} U_1 & U_2 \end{bmatrix} \begin{bmatrix} I & 0 \\ 0 & 0 \end{bmatrix} \begin{bmatrix} V_1 \\ V_2 \end{bmatrix} \quad \text{(Eq. 100)}$$

The residual in Eq. (99) may be rewritten neglecting the portion of the residual annihilated by the projector:

$$\tilde{r} = U_1^T r = V_1(\nu + \mu_i) \quad \text{(Eq. 101)}$$

The probability density function of the new residual $\tilde{r}$ is defined as:

$$f_{\tilde{r}}(\tilde{r}) = \frac{1}{(2\pi)^{11/2}|\Lambda_r|^{1/2}} e^{(-\frac{1}{2}(\tilde{r}^T \Lambda_r^{-1} \tilde{r}))} \quad \text{(Eq. 102)}$$

This is the density function for a Gaussian random variable $\tilde{r} = U_1^T r$ with zero mean and covariance $\Lambda_r = V_1 V V_1^T$. The value of n is equal to the number of GPS measurements used in the residual minus the state space $\delta x$ size. The density function is utilized to test the estimates in the Multiple Hypothesis Shiryayev Sequential Probability Ratio Test (MHSSPRT). Those residuals conforming to the Gaussian characteristics are not likely to have a fault. However, those residuals that are consistently multiple standard deviations away from the mean value are likely to have a failure.

To detect a failure, the GPS satellites are ordered into subsets. Each subset includes all of the satellites except one. For each subset, the satellite that is excluded is assumed to be faulted. A separate least squares solution is computed for each subset of satellites using Eq. (860 through Eq. (96). The residual and probability density functions are then formed for each subset as in Eq. (99) through Eq. (102). Referring back to FIG. 3, the residuals are formed in residual generator 300. These probability density functions are tested using, for example, a MHSSPRT method in residual processor 305. This test sequentially updates the probability that each subset has a fault. If a satellite failure occurs, then all of the subsets will show a non-zero-mean probability density function except for the set that excluded the satellite. When the probability estimate of the case that excludes the faulted satellite reaches a set probability limit, a fault is declared and the satellite is excluded from the possible sets before use in the GEKF implemented in fault tolerant estimator 315. The tests are reset without that satellite and the process resumes looking for additional satellite failures.

Differential GPS Fault Detection

The methodology just discussed may be used to estimate failures in differential GPS measurements (DGPS). Calculating the relative state requires the differencing of state and pseudorange quantities. The relative state estimate becomes:

$$\Delta \overline{x} = \overline{x}_{tank} - \overline{x}_{rec} \quad \text{(Eq. 103)}$$

An a priori relative range may be calculated as:

$$\Delta \overline{\rho} = \overline{\rho}_{tank} - \overline{\rho}_{rec} \quad \text{(Eq. 104)}$$

A single differenced GPS measurement is the difference of two range measurements from a common satellite. The receiver range measurement of satellite i is subtracted from the tanker measurement of satellite i to form the single difference range measurement. This measurement eliminated the common mode errors defined in Eq. (90) and is denoted as:

$$\Delta \tilde{\rho} = (\overline{\rho}_{tank} + H_{tank}\delta x_{tank} + \nu_{tank}) - (\overline{\rho}_{rec} + H_{rec}\delta x_{rec} + \nu_{rec}) \quad \text{(Eq. 105)}$$

Since the distance between the tanker and receiver is small in comparison to the distance to the satellites when the receiver is in contact position, it may be assumed that $H_{tank} \approx H_{rec}$. A new relative range error may thus be defined as $$\Delta \tilde{\rho} = \overline{\rho}_{tank} - \overline{\rho}_{rec} + H_{tank}(\delta x_{tank} - \delta x_{rec}) + \nu_{tank} - \nu_{rec} = \Delta\overline{\rho} + H_{tank}\Delta\delta x + \Delta \nu \quad \text{(Eq. 106)}$$

The new, relative state estimate error $\Delta \delta x$ is estimated using a weighted least squares solution to Eq. (106)

$$\Delta \delta \hat{x} = [(H_{tank}^T(2\Delta V^{-1})H_{tank}^T(2\Delta V^{-1})](\Delta\tilde{\rho} - \Delta\overline{\rho}) \quad \text{(Eq. 107)}$$

And the posteriori residual for testing in the MHSSPRT is described as:

$$r_\Delta = \tilde{\rho} - \overline{\rho} - H\Delta\delta x - \mu_i - \Delta\nu \quad \text{(Eq. 108)}$$

Note that the fault $\mu_i$ may be from either the tanker or receiver. This particular test does not isolate the fault to the tanker or receiver, but it does identify that a fault exists in the relative range estimates. The absolute estimates tests using the residuals defined in Eq. (97) are required to isolate a failure to either the tanker or receiver. However, the differential residual defined in Eq. (108) is not susceptible to common mode errors and the relative measurement covariance ΔV is typically an order of magnitude smaller than the absolute covariance V for each vehicle which must be increased substantially in order to compensate for the unmodeled atmospheric effects.

As discussed with regard to absolute GPS fault detection, a projector P is chosen such that PH=0 and used to modify the differential residual and eliminate the effect of the unknown estimation error. The results follow the previous development to form a new residual $\tilde{r}_\Delta = U_1 r_\Delta = V_1(\Delta v + \mu_i)$. The probability density function of this residual assuming no fault may be defined by $$f_{\tilde{r}_\Delta}(\tilde{r}_\Delta) = \frac{1}{(2\pi)^{11/2}|\Lambda_{r_\Delta}|^{1/2}} e^{(-\frac{1}{2}(\tilde{r}_\Delta^T \Lambda_{r_\Delta}^{-1} \tilde{r}_\Delta))} \quad \text{(Eq. 109)}$$

As discussed with regard to absolute GPS measurements, residual generator 300 may generate the appropriate residuals having probability density functions as shown in Eq. (109). Residual processor 305 then examines whether the residuals remain within the density function or because the residuals provide insight into the health of the DGPS measurements. If the residuals remain within the density function, then the probability of a failure is small. If the residuals reside outside the density functions, then the probability of failure is more likely. Therefore, the double differenced measurements may be placed into sub-groups. Each subgroup utilizes all of the satellites except for one, with each subgroup choosing a different satellite measurement to exclude. The differential GPS residuals are then processed through the MHSSPRT that calculates the probability that each of the subgroups is healthy while the others are faulted. If one residual moves to a probability of one or to some pre-defined bound, then the satellite that was excluded from that subgroup is declared faulty and removed from use in the measurement set. New subgroups are formed from the remaining satellites, and the process continues.

The same process may be used for double differenced carrier phase measurements that may be tested independently or with the DGPS measurements in order to form additional measurements. For double differenced carrier phase measurements, the projector is different, however, and must be calculated based on the double differenced line of sight matrix. The MHSSPRT method will now be discussed in more detail.

Multiple Hypothesis Shiryayev Sequential Probability Ratio Test

The Multiple Hypothesis Shiryayev Sequential Probability Ratio Test (MHSSPRT) is a hypothesis testing scheme that may be performed in residual processor 305. The test is designed to detect changes in a residual history in minimum time based on assumed statistical properties. Given a residual history and associated probability density function for a set of hypotheses, the MHSSPRT calculates the probability that each hypothesis is true relative to the other hypotheses. The MHSSPRT assumes that a base condition exists which is healthy and then calculates the probability of a change to a different hypothesis assuming a probability of failure at each time step.

In equation form, the probability that a hypothesis j is correct at time 0 is given by an initial condition:

$$F_{0,j} = \pi_j \quad \text{(Eq. 110)}$$

The initial condition $\pi_j$ is chosen as a design parameter. At each measurement time k, there is a finite probability that a failure has occurred between the time of the current measurement k and the previous time step, k−1. The propagation of the probability is:

$$\phi_{k,j} = F_{k,j} + \tilde{p}_j(1 - \Sigma_{l=0}^N F_{k,j}) \quad \text{(Eq. 111)}$$

The value of N is the total number of possible fault modes currently addressed in the MHSSPRT. For example, if 7 satellites are in view, then there are at least 7 fault modes considered, one for each satellite. The total health condition in which it is assumed that all satellites are healthy may or may not be included as a design choice.

When measurements become available, the residuals and associated density functions are calculated as previously described. The densities are updated utilizing the following update formula.

$$F_{k+1,j} = \frac{\varphi_{k,j} f_{\tilde{r}_{k+1}|h_j}(\tilde{r}_{k+1} \mid h_j)}{\sum_{l=0}^{N} \varphi_{k,j} f_{\tilde{r}_{k+1}|h_j}(\tilde{r}_{k+1} \mid h_j)} \quad \text{(Eq. 112)}$$

After each update, the probability is tested against a value. If the probability exceeds a threshold (such as 0.99999) then that probability is declared true. The assumed hypothesis is assumed to be accurate. In this case, the subset of GPS measurements utilized which reaches this value is the set of measurements that is healthy since all other subsets (hypothesized healthy measurements) have a probability near zero, indicating that the satellite excluded by the first subset is unhealthy. In this way the MHSSPRT identifies the failure and isolates the failure from other possible failures.

EO Fault Detection

EO fault detection is similar to the differential GPS fault detection techniques presented previously. A least squares technique is presented as a means of utilizing excess observability in the vision systems as a means of self checking. Two different types of estimation are described.

Reference Point Least Squares Filter

Reference point estimation assumes that the EO system is capable of identifying fixed points on the receiver aircraft with known lever arms between the points. The result is that the EO system provides bearings measurements (elevation and azimuth) in the camera frame to each of the reference points. Reference points may be active such as beacon systems, passive such as known paint markings, or inherent in the receiver design such as the refueling receptacle. The relative position in the camera frame V from the camera to a reference point is given by:

$$\begin{aligned} r_{T,R_i}^V &= \Delta P_i^V \\ &= \begin{bmatrix} x_{R_i} - x_T \\ y_{R_i} - y_T \\ z_{R_i} - z_T \end{bmatrix} \\ &= (\Delta P^V) + C_{B_R}^V L_{R_{INS},R_i}^{B_R} \end{aligned} \quad \text{(Eq. 113)}$$

In this case, the relative position is calculated only in the vision sensor reference frame. The sensor frame is designed as a right handed Cartesian frame with x through the lens of the camera looking out towards the receiver, the y-axis is defined to starboard of the camera, and the z-axis points down. The axes are centered at the lens of the vision system. The rotation matrix $C_{B_R}^V$ defines the rotation from the receiver body frame to the tanker vision frame. The lever arm $L_{R_{INS},R_i}^{B_R}$ is the vector position in the receiver body frame from the receiver INS (or other common reference point) to the reference point i. This vector is assumed known a priori. Since no other instruments are involved, the lever arm from the tanker vision system to the GPS or IMU is ignored. This algorithm calculates the position and attitude of the receiver relative to the vision system. The values for $x_T$, $y_T$, and $z_T$ form the origin of the reference frame and may be set to zero for convenience. The error in the relative position is defined as the difference between the a priori estimate of the relative position and a perturbation:

$$\Delta P^V = \Delta \bar{P}^V + \delta \Delta P^V \quad \text{(Eq. 114)}$$

The error in the attitude is defined relative to the target body frame as:

$$C_{B_R}^V = C_{\bar{B}_R}^V (I + 2[\delta q_R \times]) \rightarrow C_V^{B_R} = (I - 2[\delta q_R \times]) C_V^{\bar{B}_R} \quad \text{(Eq. 115)}$$

The definition for $e^V$, the error between the true and estimated position and attitude is $$e_i^V = \begin{bmatrix} e_x^V \\ e_y^V \\ e_z^V \end{bmatrix} \quad \text{(Eq. 116)}$$

$$= \begin{bmatrix} x_{R_i} - x_T \\ y_{R_i} - y_T \\ z_{R_i} - z_T \end{bmatrix} - \begin{bmatrix} \bar{x}_{R_i} - \bar{x}_T \\ \bar{y}_{R_i} - \bar{y}_T \\ \bar{z}_{R_i} - \bar{z}_T \end{bmatrix}$$

$$= \Delta P^V - \Delta \bar{P}^V + C_{B_R}^V L_{R_{INS},R_i}^{B_R} - C_{\bar{B}_R}^V L_{R_{INS},R_i}^{B_R}$$

Substituting Eq. (114) and Eq. (115) into Eq. (116) produces the following equation in terms of the error perturbations:

$$e^V = \Delta \bar{P}^V + \delta \Delta P^V - \Delta \bar{P}^V + C_{\bar{B}_R}^V (I + 2[\delta q_R \times]) L_{R_{INS},R_i}^{B_R} - C_{\bar{B}_R}^V L_{R_{INS},R_i}^{B_R}$$

$$e^V = \delta \Delta P^V - 2 C_{\bar{B}_R}^V [L_{R_{INS},R_i}^{B_R} \times] \delta q_R \quad \text{(Eq. 117)}$$

The measurement matrix $H_e$ is defined as $$H_e = [I - 2 C_{\bar{B}_R}^V [L_{R_{INS},R_i}^{B_R} \times]] \quad \text{(Eq. 118)}$$

The state $\delta x$ is now the reduced order state:

$$\delta x = \begin{bmatrix} \delta \Delta P^V \\ \delta q_T \end{bmatrix} \quad \text{(Eq. 119)}$$

The error equation in terms of the Cartesian location is of a form:

$$e^V = H_e \delta x \quad \text{(Eq. 120)}$$

If the measurements are in terms of a vector position of the reference point location relative to the camera (such as in the case of phase space measurements), then the residual error measurement becomes:

$$r_V = \tilde{P}^V - \bar{P}^V = H_e \delta x + v_V \quad \text{(Eq. 121)}$$

In this case, the measurement $\tilde{P}^V$ is the position of the reference point in the vision reference frame measured by the phase space estimation system with additive noise $v_V$.

However, if the vision or Electro-optical system produces angle measurements in the form of elevation and azimuth, then the measurements are defined as:

$$\alpha_i = \tan^{-1}\left(\frac{y_T - y_{R_i}}{x_T - x_{R_i}}\right) \quad \text{(Eq. 122)}$$

and $$\beta_i = \tan^{-1}\left(\frac{z_T - z_{R_i}}{x_T - x_{R_i}}\right) \quad \text{(Eq. 123)}$$

The conversion of specialized angle measurements to Cartesian errors may be performed using a Modified Gain Extended Kalman Filter as discussed previously. In this filter, a measurement matrix $H_V$ is defined such that a residual of the angles for each reference point take the form:

$$r_{\alpha\beta} = \begin{bmatrix} \tilde{\alpha}_i - \bar{\alpha}_i \\ \tilde{\beta}_i - \bar{\beta}_i \end{bmatrix} \quad \text{(Eq. 124)}$$

$$= H_V H_e \delta x + \begin{bmatrix} v_\alpha \\ v_\beta \end{bmatrix}$$

In addition, the residuals which have measurements in spherical coordinates have linear errors in the Cartesian coordinates. The measurement noise $v_\alpha$ and $v_\beta$ are typically modeled as pixel noise on the angles.

Using multiple reference points (multiple are required for full observability), it is possible to estimate the solution to Eq. (124) using the following least squares solution:

$$\delta \hat{x} = (H_e^T H_V^T V_V^{-1} H_V H_e)^{-1} H_e^T H_V^T V_V^{-1} \left( \begin{bmatrix} \tilde{\alpha} - \bar{\alpha} \\ \tilde{\beta} - \bar{\beta} \end{bmatrix} \right) \quad \text{(Eq. 125)}$$

$$= \begin{bmatrix} \delta \Delta P^V \\ \delta q_{B_T} \end{bmatrix}$$

The relative position $\Delta \hat{P}^E$ is corrected using $$\Delta \hat{P}^E = \Delta \bar{P}^E + \Delta \delta \hat{P} \quad \text{(Eq. 126)}$$

The relative attitude is corrected by first constructing the quaternion correction:

$$Q_{\hat{B}_T}^{B_T} = \begin{bmatrix} \sqrt{1 - (\delta q_T^T \delta q_T)} \\ \delta q_T \end{bmatrix} \quad \text{(Eq. 127)}$$

A corrected quaternion may then be formed by rotating the a priori quaternion by the corrected update quaternion:

$$Q_{\hat{B}_T}^V = Q_{\bar{B}_T}^V \otimes Q_{\hat{B}_T}^{\bar{B}_T} \quad \text{(Eq. 128)}$$

At this point the least squares solution to the relative navigation system is defined. The extension to fault detection is to assume that one of the reference points is invalid. A least squares fault detection filter as discussed above is then utilized to determine which reference point is invalid and exclude it from the estimation process.

Silhouette Matching Least Squares

The previous section assumed that the image processing algorithm identified reference points and calculated the bearings measurements to the vehicle. An alternative approach is to attempt to use silhouette matching algorithms in which the target is matched with a library of silhouettes of the target to estimate the range and orientation of the entire target or target area. The output of this type of algorithm provides additional information including a relative range and relative attitude of the target to the vision system. An additional score of how well the target and silhouette match is also included as a noise factor.

The benefit of silhouette matching is that it inherently takes into account the geometry of the lever arms over an area of the target and produces range and attitude information in addition to bearings measurements. The process may be repeated locally or globally for a given target geometry. For instance, the silhouette used may match the entire target geometry or just a portion of the target such as an aircraft canopy or tail section. Through the use of multiple silhouettes and sub-silhouettes for a given target, multiple relative ranges and attitudes may be used to estimate the total target range and relative attitude. However, a disadvantage of this type of algorithm is that each measurement is complex because it consists of complete relative position and attitude rather than just angles. The result is a highly correlated vector measurement. The capability of matching the silhouette to the image does not have a known, stochastic error model in terms of the measurements presented. Characterizing the measurements becomes more difficult.

A single silhouette measurement produces a complete state of the following form:

$$\tilde{y}_i = \begin{bmatrix} \tilde{\rho}_i \\ \tilde{\alpha}_i \\ \tilde{\beta}_i \\ Q_{B_T}^V \end{bmatrix} \quad \text{(Eq. 129)}$$

where $\tilde{\alpha}_i$ and $\tilde{\beta}_i$ have the same angle definition as in Eq. (122) and Eq. (123). The new variable $\tilde{\rho}_i$ represents the scalar range from the vision system to the target along the vector line defined by $\tilde{\alpha}_i$ and $\tilde{\beta}_i$. The quaternion is the estimated attitude of the target relative to the camera system as previously defined as part of Eq. (128).

Note that the silhouette matching algorithm still reflects the estimate of the range, attitude, and bearings from the camera to a particular point on or within the target. This location may be different from algorithm to algorithm. Regardless, the silhouette reference point may be different than the location of the target INS or other reference point. Therefore, the relative range from the camera to the target INS is still defined as:

$$r_{T,R_i}^V = \Delta P_i^V \quad \text{(Eq. 130)}$$

$$= \begin{bmatrix} x_{R_i} - x_T \\ y_{R_i} - y_T \\ z_{R_i} - z_T \end{bmatrix}$$

$$= (\Delta P^V) + C_{B_R}^V L_{R_{INS}, R_i}^{B_R}$$

The error model measurement for the measurements of $\tilde{\alpha}_i$ and $\tilde{\beta}_i$ have been previously defined. The definition of the range measurement in the camera coordinate frame is:

$$\rho_i = \|\Delta P_i^V\| \quad \text{(Eq. 131)}$$

$$= \left\| \begin{bmatrix} x_{R_i} - x_T \\ y_{R_i} - y_T \\ z_{R_i} - z_T \end{bmatrix} \right\|$$

$$= \sqrt{(x_{R_i} - x_T)^2 + (y_{R_i} - y_T)^2 + (z_{R_i} - z_T)^2}$$

The a priori estimate of the range is determined from:

$$\bar{\rho}_i = \|\Delta \bar{P}_i^V\| \quad \text{(Eq. 132)}$$

$$= \left\| \begin{bmatrix} \bar{x}_{R_i} - \bar{x}_T \\ \bar{y}_{R_i} - \bar{y}_T \\ \bar{z}_{R_i} - \bar{z}_T \end{bmatrix} \right\|$$

$$= \sqrt{(\bar{x}_{R_i} - \bar{x}_T)^2 + (\bar{y}_{R_i} - \bar{y}_T)^2 + (\bar{z}_{R_i} - \bar{z}_T)^2}$$

The range measurement is defined as truth plus an additive noise term:

$$\tilde{\rho}_i = \bar{\rho}_i + v_\rho \quad \text{(Eq. 133)}$$

Taking a first order perturbation in $\Delta P^V$, the true relative position is again defined relative to the a priori range as:

$$\Delta P_i^V = \Delta \bar{P}_i^V + \delta \Delta P_i^V \quad \text{(Eq. 134)}$$

Taking a first order perturbation around the a priori estimate of range, the true range is approximated by:

$$\rho_i = \bar{\rho}_i + H_{\rho i} \delta \Delta P_i^V \quad \text{(Eq. 135)}$$

Where $H_\rho$ is defined as:

$$H_{\rho i} = \frac{\partial \rho_i}{\partial \delta \Delta P_i^V}\bigg|_{\Delta P_i^V} = \begin{bmatrix} \dfrac{\bar{x}_{R_i} - \bar{x}_T}{\|\Delta \bar{P}_i^V\|} & \dfrac{\bar{y}_{R_i} - \bar{y}_T}{\|\Delta \bar{P}_i^V\|} & \dfrac{\bar{z}_{R_i} - \bar{z}_T}{\|\Delta \bar{P}_i^V\|} \end{bmatrix} \quad \text{(Eq. 136)}$$

The measurement is therefore $$\tilde{\rho}_i = \bar{\rho}_i + H_{\rho i} \delta \Delta P_i^V + v_\rho \quad \text{(Eq. 137)}$$

For the reduced order state space defined in Eq. (119), the equivalent measurement function is $$\tilde{\rho}_i = \bar{\rho}_i + H_{\rho i} \begin{bmatrix} I & -2C_{B_R}^V [L_{R_{INS}, R_i}^{B_R} \times] \end{bmatrix} \begin{bmatrix} \delta \Delta P^V \\ \delta q \end{bmatrix} + v_\rho \quad \text{(Eq. 138)}$$

$$= \bar{\rho}_i + H_{\rho i} H_e \delta x + v_\rho$$

The quaternion measurement poses a problem in that simply converting to Euler angles and differencing the measurement with the a priori estimate is unacceptable because it obscures the inherent order of operations of the angles requires to correctly define the orientation. Further, the angles are difficult to reconcile with the quaternion errors presented earlier. However, using cosine rotation matrices, the quaternion error in the measurement may be defined. The definition of the true cosine rotation matrix in terms of the a priori estimate is defined as:

$$C_{B_T}^V = C_{\bar{B}_T}^V (I + 2[\delta q \times]) \quad \text{(Eq. 139)}$$

A similar version exists for Euler angle errors, but not the difference of the Euler angles. A measurement of Euler angles can be converted to a cosine rotation matrix with an error in the rotation due to noise.

The measurement matrix as a function of truth becomes:

$$C_{\tilde{B}_T}^V = C_{B_T}^V (I + [v_q]) \quad \text{(Eq. 140)}$$

In this case, the noise $v_q$ is assumed to be zero mean Gaussian noise on the Euler angles and small in comparison to the angles values. The vector $v_q$ is defined as:

$$v_q = \begin{bmatrix} v_\Phi \\ v_\Theta \\ v_\Psi \end{bmatrix} \quad \text{(Eq. 141)}$$

The covariance for $v_q$ is defined as $V_q$. Substituting Eq. (139) into Eq. (140) gives a nonlinear expression for the attitude error and noise:

$$C_{B_T}^V = C_{\tilde{B}_T}^V (I+2[\delta q \times])(I+[v_q \times]) \rightarrow$$
$$C_{B_T}^V C_V^{\tilde{B}_T} - I = 2[\delta q \times] + [v_q \times] + 2[\delta q \times][v_q \times] \quad \text{(Eq. 142)}$$

As can be seen in Eq. (142), the resulting nonlinear definition results in state dependent noise. Two options may be considered for handling this problem. The first is to ignore the cross coupling between the error in the quaternion and the measurement noise. This is not an unreasonable choice since the a priori estimate of the attitude error is zero so should not affect steady state performance. In that case, it is possible to write three equations for the measurement function as:

$$(C_{B_T}^V C_V^{\tilde{B}_T})_{32} = 2\delta q_1 + v_\Phi$$

$$(C_{B_T}^V C_V^{\tilde{B}_T})_{13} = 2\delta q_2 + v_\Theta$$

$$(C_{B_T}^V C_V^{\tilde{B}_T})_{21} = 2\delta q_3 + v_\Psi \quad \text{(Eq. 143)}$$

The notation $(C_{\tilde{B}_T}^V C_V^{\tilde{B}_T})_{ij}$ indicates the $i^{th}$ row and $j^{th}$ column of the 3×3 rotation matrix. The use of Eq. (143) is valid provided that the state dependent noise term in Eq. (142) is ignored. The resulting measurement residual to be processed in a least squares filter is then:

$$r_q = \begin{bmatrix} \left(C_{B_T}^V C_V^{\tilde{B}_T}\right)_{32} \\ \left(C_{B_T}^V C_V^{\tilde{B}_T}\right)_{13} \\ \left(C_{B_T}^V C_V^{\tilde{B}_T}\right)_{21} \end{bmatrix} \quad \text{(Eq. 144)}$$

$$= \begin{bmatrix} 0 & 2I \end{bmatrix} \begin{bmatrix} \delta \Delta P^V \\ \delta q \end{bmatrix} + \begin{bmatrix} v_\Phi \\ v_\Theta \\ v_\Psi \end{bmatrix}$$

$$= H_q \delta x + v_q$$

The measurement matrix $H_q$ is defined as:

$$H_q = [0\ 2I] \quad \text{(Eq. 145)}$$

Six unknowns thus result. However, note that the rotation matrix in Eq. (142) provides nine equations which may be used to solve for the six unknowns. The set of equations is:

$$C_{B_T}^V C_V^{\tilde{B}_T} - I = \begin{bmatrix} -v_\Psi \delta q_3 - v_\Theta \delta q_2 & -\delta q_3 - v_\Psi + v_\Phi \delta q_2 & \delta q_2 + v_\Theta + v_\Phi \delta q_3 \\ \delta q_3 + v_\Psi + v_\Theta \delta q_1 & -v_\Psi \delta q_3 - v_\Phi \delta q_1 & -\delta q_1 - v_\Phi + v_\Theta \delta q_3 \\ -\delta q_2 - v_\Theta + v_\Psi \delta q_3 & \delta q_1 - v_\Phi + v_\Psi \delta q_2 & -v_\Theta \delta q_2 - v_\Phi \delta q_1 \end{bmatrix}$$

(Eq. 146)

These could be solved explicitly. The noise vector may be correlated with the range and angular measurements defined previously which may make the solution to Eq. (146) ambiguous with relationship to the other noise factors. The total measurement equation is:

$$\begin{bmatrix} \tilde{\rho}_i \\ \tilde{\alpha}_i \\ \tilde{\beta}_i \\ Q_{B_{\tilde{T}}}^V \end{bmatrix} = \begin{bmatrix} \overline{\rho}_i \\ \overline{\alpha}_i \\ \overline{\beta}_i \\ Q_{B_T}^V \end{bmatrix} + \begin{bmatrix} H_{\rho i} \\ H_{V\alpha} \\ H_{V\beta} \\ H_q \end{bmatrix} H_e \begin{bmatrix} \delta \Delta P^V \\ \delta q \end{bmatrix} + \begin{bmatrix} v_\rho \\ v_\alpha \\ v_\beta \\ v_q \end{bmatrix} \quad \text{(Eq. 147)}$$

Using this set of measurement models, a least squares filter may be calculated that is similar to Eq. (125) so as to estimate the state using silhouette matching.

EO Fault Detection

A methodology for utilizing the vision system to detect failures in the measurements is presented. The methodology takes advantage of the least squares estimator structure presented previously. In this case, it is assumed that one of the reference points is invalid and the goal is to find the invalid measurement. The cause of the measurement is unknown as well as the signal.

Given a set of possibly nonlinear measurements of the form:

$$\tilde{y}_i = f(x) + v_i \quad \text{(Eq. 148)}$$

where the measurement $\tilde{y}_i$ is a nonlinear function of the state x and additive noise $v_i$, then the generalized least squares fault detection problem is of the form:

$$\tilde{y}_i = \overline{y}_i + H_i \delta x + v_i + \mu_i \quad \text{(Eq. 149)}$$

In this case, the measurement $\tilde{y}_i$ is the ith measurement, the a priori estimate of the measurement is $\overline{y}_i = f(\overline{x})$, the associated state error $\delta x$ is the first order perturbation of the error in $\overline{y}_i$ with the measurement matrix $H_i$ defined as:

$$H_i = \left.\frac{\partial y}{\partial x}\right|_{\overline{x}} \quad \text{(Eq. 150)}$$

The state $\overline{x}$ is the a priori estimate and the measurement matrix is linearized around this estimate. The measurement is corrupted by noise $v_i$ and an unknown fault $\mu_i$ may exist in the ith measurement. It is assumed that with N measurements, only one fault exists.

Given the N measurements and no fault, the optimal least squares solution to the problem in Eq. (149) is given by:

$$\delta \hat{x} = (H^T V^{-1} H)^{-1} H^T V^{-1} (\tilde{y} - \overline{y}) \quad \text{(Eq. 151)}$$

In this case, the noise matrix V represents the covariance matrix of all of the measurements. The state is updated as $$\hat{x} = \overline{x} + \delta \hat{x} \quad \text{(Eq. 152)}$$

The residual is the difference between the measurement and the a priori estimate. If a fault occurs, then the residual has takes the form:

$$r = y - \overline{y} = H \delta x + v + \mu \quad \text{(Eq. 153)}$$

In this case, $\mu$ is considered to be a column vector of zeros except for the fault signal $\mu_i$ on the ith row representing a fault in the ith measurement.

An annihilator may be constructed such that the effect of the error in the state estimate is annihilated from the residual. A common annihilator is:

$$D = I - H(H^T H)^{-1} H^T \quad \text{(Eq. 154)}$$

The annihilator is designed such that DH=0. The existence of the annihilator assumes that $(H^T H)^{-1}$ exists. This condition essentially requires that the state is fully observable by the set of measurements. It also implies that the measurement matrix H has full column rank. Using the annihilator on the residual produces:

$$Dr = D(\tilde{y} - \bar{y}) = D(H\delta x + v + \mu) = D(v + \mu) \quad \text{(Eq. 155)}$$

To be an effective fault detection method, more measurements than state errors should be present. In other words, the measurement matrix H has full column rank and more rows than columns. If this is the case, then the annihilator may be decomposed using a singular value decomposition of the form:

$$D = \begin{bmatrix} U_1 & U_2 \end{bmatrix} \begin{bmatrix} I & 0 \\ 0 & 0 \end{bmatrix} \begin{bmatrix} V_1 \\ V_2 \end{bmatrix} \quad \text{(Eq. 156)}$$

The identity matrix I is a square matrix of dimension equal to the state vector. Using this generalized form, a new residual may be constructed from the old one $$\tilde{r} = U_1^T r = V_1 (v + \mu) \quad \text{(Eq. 157)}$$

If it is assumed that the noise v is a zero mean, Gaussian distributed random variable with covariance V, then the new residual has a Gaussian probability density function (assuming no fault) which is given by:

$$f_{\tilde{r}}(\tilde{r}) = \frac{1}{(2\pi)^{11/2} |\Lambda_r|^{1/2}} e^{\left(-\frac{1}{2}(\tilde{r}^T \Lambda_r^{-1} \tilde{r})\right)} \quad \text{(Eq. 158)}$$

Referring back to FIG. 3, residual generator 300 generates the residuals having the probability densities shown in Eq. (158). For this relationship, the covariance is given by:

$$\Lambda_r = V_1 (V)^{-1} V_1 \quad \text{(Eq. 159)}$$

The value of n is the dimension of $\tilde{r}$.

If a fault is present, then the residual statistical properties of the residual will not follow Eq. (158) so that a means of testing the residual set against a probability ratio test such as the MHSSPRT discussed previously is formed. Such a test may be carried out in residual processor 305 of FIG. 3.

For more than one fault, the measurement sets are subdivided into subsets. Each subset contains all of the measurements except one. Each subset is utilized to compute a separate estimate of the state. The residual is then tested using, for example, a MHSSPRT method. If a fault occurs in one measurement, then all of the subsets which incorporate that measurement will be affected and the respective statistical properties of the residuals will no longer be zero mean Gaussian. However, the subset without the fault will remain zero mean Gaussian effectively identifying the faulty measurement. The measurement is then excluded from the measurement set and new subsets are created for the remaining measurements until too few measurements remain to provide any analytic redundancy. A subset may be created to test the faulty measurement and reintroduce it when the fault disappears, detected when the residual process is again zero mean and Gaussian.

INS Fault Detection

Detecting failures in the INS is more subtle than detecting faults in the GPS and EO measurements. The fundamental measurements of an INS are angular velocity and acceleration in the vehicle's local body frame whereas the EO and GPS each measure relative position in a common coordinate frame. The EO system operates in the tanker camera frame and the GPS system operates in the Earth Centered Earth Fixed reference frame. Therefore, the only way to detect IMU instrument failures is through the dynamics of the inertial navigation system. This may be done separately for each IMU or through the GEKF.

INS Fault Detection through the GEKF

The GEKF may be extended to include INS faults. To do so, Eq. (1.1.7) is modified as follows:

$$\delta \dot{x} = A \delta x + Bw + f\mu \quad \text{(Eq. 160)}$$

The error in the navigation state defined as:

$$\delta x = \begin{bmatrix} \delta P^E \\ \delta V^E \\ \delta q \\ \delta b_\omega \\ \delta b_f \\ c\delta \tau \end{bmatrix} \quad \text{(Eq. 161)}$$

where the perturbed error δx consists of 18 states: a position error $\delta P^E$ in the ECEF frame, a velocity error $\delta V^E$, an attitude error δq, a bias in the rate gyros $\delta b_\omega$, a bias in the accelerometers $\delta b_f$, and a bias in the GPS clock measurements cδτ which includes bias, drift, and clock acceleration terms. The errors are influenced by the noise in the inertial navigation system defined as Bw to be a zero mean Gaussian random variable with covariance W. A fault signal μ is introduced through a fault direction matrix F. A different fault matrix F is defined for each fault type, whether it is an x, y, z accelerometer, or an x, y, z gyro. Once the fault matrix is defined a separate Kalman filter is defined for each fault type to be tested.

The measurements take the form:

$$\tilde{\rho} = \bar{\rho} + H\delta x + v \quad \text{(Eq. 162)}$$

This model assumes that all of the GPS measurements are healthy. The measurement matrix H includes the lever arm distance from the IMU to the GPS antenna.

Discrete Time Fault Detection

A filter is designed to provide the best estimate of the state δx and then block the effect of a failure μ on the state estimation process. The failure signal is not known, but the direction that the failure enters the system is defined by the matrix f in the dynamics of Eq. (160). The filter processes the GPS measurements in a means similar to the Kalman filter for a single vehicle GPS/INS system. However, the filter blocks the effect of the fault on the estimation process and provides a fault-free residual process with which to test against other filters which may not be tuned to block the particular fault. A filter that is not tuned to block the failure will exhibit non-Gaussian behavior while a filter tuned to block a particular failure will have a residual that remains Gaussian in the presence of the failure.

The discrete time fault detection filter of the form presented in Eq. (160) with measurements defined in Eq. (162) takes the following recursive form. First the dynamics and fault model to a discrete time form. The following approximations may be utilized for a generic time step $\Delta t$:

$$\Phi = e^{A\Delta t} \approx I + A\Delta t \quad \text{(Eq. 163)}$$

$$\Gamma = \left(I\Delta t + \frac{1}{2}A\Delta t^2\right)B \quad \text{(Eq. 164)}$$

$$F = \left(I\Delta t + \frac{1}{2}A\Delta t^2\right)f \quad \text{(Eq. 165)}$$

The new dynamics are then:

$$\delta x(t+\Delta t) = \Phi \delta x(t) + \Gamma w + F\mu \quad \text{(Eq. 166)}$$

The state update thus becomes $$\delta \hat{x} = \delta \overline{x} + K(\tilde{\rho} - \overline{\rho} H \delta \overline{x}) \quad \text{(Eq. 167)}$$

The gain K is selected in order to minimize the following cost function:

$$\max_{\mu} \max_{x(0)} \frac{1}{2} \sum_{0}^{k\Delta t} \left( \begin{array}{c} \|\tilde{\rho} - \overline{\rho} - H\delta\overline{x}\|_{V^{-1}} \\ \|\mu\|_{Q_F}^2 - \|\delta x - \delta \overline{x}\|_{Q_s} \end{array} \right) - \frac{1}{2}\|x(0) - \delta \overline{x}(0)\|_{\Pi_0} \quad \text{(Eq. 168)}$$

The gain K may thus be constructed using the fault detection update defined as:

$$K = \Pi H^T (R + H\Pi H^T)^{-1} \quad \text{(Eq. 169)}$$

The value for R is a weighted version of the measurement noise covariance and is defined as $$R = V^{-1} - HQ_s H^T \quad \text{(Eq. 170)}$$

The matrix $Q_s$ is a design parameter matrix designed to improve filter performance. Values must be chosen carefully in order to maintain positive definiteness. The a priori covariance $\Pi$ is updated with the measurements using the following update formula:

$$M = \Pi - \Pi H^T (R + H\Pi H^T)^{-1} H\Pi \quad \text{(Eq. 171)}$$

The state error is propagated forward in time using Eq. (166), unless the correction is applied to the state of the vehicle in which case the state error is zeroed after each correction. The covariance is propagated forward in time using:

$$\Pi(t+\Delta t) = \Phi M \Phi^T + \frac{1}{\gamma} FQ_F F^T + \Gamma W \Gamma^T \quad \text{(Eq. 172)}$$

This propagation is similar to a standard Kalman filter with the covariance modified by the discrete time dynamics $\Phi$ with additive process noise W. The additional term essentially "blocks" the fault direction F in the covariance, increasing the uncertainty in that direction by a weighting factor $Q_F$ in order to force the filter to accept that there is larger uncertainty in that direction due to the possible existence of a failure. The weighting term $\gamma$ is sometimes used as a design parameter to maintain reasonable filter performance, but is set to one for these sets of experiments.

Using this filter, the residual may be tested for failures. The posteriori residual is formed as:

$$\tilde{r} = \tilde{\rho} - \hat{\rho} \quad \text{(Eq. 173)}$$

A projector P is constructed to annihilate the effect of the state estimation error on the measurement residual, (PH=0). The annihilator has a null space associated with the fault direction.

The matrix P may be decomposed as with other filter structures presented into the following form:

$$P = [U_1 \quad U_2] \begin{bmatrix} I & 0 \\ 0 & 0 \end{bmatrix} \begin{bmatrix} V_1 \\ V_2 \end{bmatrix} \quad \text{(Eq. 174)}$$

The identity matrix I is a square matrix of dimension equal to the state vector. Using this generalized form, then a new residual may be constructed from the old one $$\tilde{r} = U_1^T \tilde{r} = V_1(v + HF\mu) \quad \text{(Eq. 175)}$$

If it is assumed that the measurement noise $v$ is a zero mean, Gaussian distributed random variable with covariance V, then the new residual has a Gaussian probability density function (assuming no fault) which is given by:

$$f_{\tilde{r}}(\tilde{r}) = \frac{1}{(2\pi)^{11/2}|\Lambda_r|^{1/2}} e^{\left(-\frac{1}{2}(\tilde{r}^T \Lambda_r^{-1} \tilde{r})\right)} \quad \text{(Eq. 176)}$$

In this case the covariance is given by:

$$\Lambda_r = V_1(V)^{-1} V_1 \quad \text{(Eq. 177)}$$

The value of n is the dimension of $\tilde{r}$.

As discussed previously, the residual may be tested using the MHSSPRT method defined previously. A filter designed to block a particular failure will have a residual that remains zero mean and Gaussian even in the presence of a failure. However, other failures will exhibit non-Gaussian behavior indicating that a failure has occurred. The filter designed to block the failure remains healthy and the operation continues without interruption while other filters are discarded as having processed faulty data. The residual is used to detect and isolate the failure and the filter designed to block the failure is utilized to continue the estimation process in the even of the failure. Therefore, a bank of fault detection filters 300 may be used as shown in FIG. 3. Each filter is tuned to block one of the accelerometer axes or rate gyro axes. Six filters are required in addition to the healthy filter which assumes no fault. When a failure occurs all of the filters will show non-Gaussian statistics except for the filter tuned to block the failure. This filter will remain healthy despite the failure and can be used to continue estimation.

As seen in FIG. 3, a fault reconstruction process 310 identifies the fault magnitude introduced by, for example, a particular accelerometer of rate gyroscope. Fault tolerant estimator 315 would thus comprise a GEKF that excludes measurements from the faulty sensor. In this fashion, an automated control of a refueling boom is enabled despite IMU faults, GPS faults, EO faults, or faults in other sensors such as RF ranging sensors.

It will be obvious to those skilled in the art that various changes and modifications may be made without departing from this invention in its broader aspects. The appended claims encompass all such changes and modifications as fall within the true spirit and scope of this invention.

We claim:

1. A system for automated control of a refueling boom coupled to a tanker aircraft, comprising:
    a first inertial measurement unit (IMU) providing inertial measurements for the tanker aircraft;
    a first GPS receiver providing a GPS location for the tanker aircraft;
    a second IMU providing inertial measurements for a receiver aircraft;

a second GPS receiver providing a GPS location for the receiver aircraft; and a processor adapted to:
- determine an IMU-derived position estimate for the tanker aircraft using the inertial measurements from the first IMU;
- determine an IMU-derived position estimate for the receiver aircraft using the inertial measurements from the second IMU;
- determine an IMU relative difference between the IMU-derived position estimates;
- determine a GPS relative difference between the GPS locations;
- determine an absolute difference between the GPS location for IMU-derived position estimate for the tanker aircraft and the GPS location for the tanker aircraft;
- filter the absolute difference, the IMU relative difference, and the GPS relative difference to derive both an absolute navigation state error for the tanker aircraft as well as a relative navigation state error between the tanker aircraft and the receiver aircraft;
- update an inertial navigation state for the tanker aircraft and an inertial navigation state for the receiver aircraft using the absolute and relative navigation state errors; and
- control the refueling boom relative to the receiver aircraft based upon the updated inertial navigation states.

2. The system of claim 1, wherein the processor is adapted to filter the differences using a Kalman filter.

3. The system of claim 2, wherein the Kalman filter is an extended Kalman filter.

4. The system of claim 1, further comprising
an electro-optic (EO) sensor adapted to image a plurality of reference points on the receiver aircraft, wherein the processor is further adapted to control the refueling boom relative to errors determined through comparison of (EO) sensor-derived locations for the reference points to inertial-navigation-state-derived locations for the reference points.

5. The system of claim 1, wherein the processor comprises at least a first processor on the tanker aircraft and a second processor on the receiver aircraft.

6. The system of claim 5, further comprising a wireless link between the receiver aircraft and the tanker aircraft adapted to permit the first and second processors to exchange positional information to aid the control of the refueling boom.

7. The system of claim 5, further comprising: an RF ranging sensor adapted to measure a range between the receiver aircraft and the tanker aircraft, wherein the processor is further adapted to control the refueling boom based upon the measured range.

8. A system for control of a refueling boom coupled to a tanker aircraft, comprising:
- a first IMU providing tanker inertial measurements for the tanker aircraft;
- a second IMU providing receiver inertial measurement for a receiver aircraft;
- a first GPS receiver providing a GPS location for the tanker aircraft;
- a second GPS receiver providing a GPS location for the receiver aircraft; and
- means for determining an IMU-derived position estimate for the tanker aircraft using the tanker inertial measurements from the first IMU, determining an IMU-derived position estimate for the receiver aircraft using the receiver inertial measurements from the second IMU, determining an IMU relative difference between the IMU-derived position estimates; determine a GPS relative difference between the GPS locations, determining an absolute difference between the GPS location for IMU-derived position estimate for the receiver aircraft and the GPS location for the receiver aircraft, filtering the absolute difference, the IMU relative difference, and the GPS relative difference to derive both an absolute navigation state error for the receiver aircraft as well as a relative navigation state error between the receiver aircraft and the tanker aircraft, updating an inertial navigation state for the receiver aircraft and an inertial navigation state for the tanker aircraft using the absolute and relative navigation state errors and controlling the refueling boom so as to automatically mate with the receiver aircraft based upon the updated inertial navigation states.

9. The system of claim 8, further comprising an electro-optic (EO) sensor adapted to image a plurality of reference points on the receiver aircraft, wherein the means is adapted to further control the refueling boom relative to errors determined through comparison of (EO) sensor-derived locations for the reference points to inertial-navigation-state-derived locations for the reference points.

10. The system of claim 9, wherein the means is further adapted to calculate tanker and receiver inertial navigation errors through comparison of the tanker and receiver inertial navigations states to positions derived from the tanker aircraft GPS receiver and the receiver aircraft GPS receiver.

11. The system of claim 8, wherein the means is further adapted to control fuel transfer from the tanker aircraft to the receiver aircraft.

* * * * *